US010088184B2

(12) United States Patent
Hirano et al.

(10) Patent No.: US 10,088,184 B2
(45) Date of Patent: Oct. 2, 2018

(54) ENVIRONMENT CONTROL SYSTEM

(71) Applicant: NEC Corporation, Tokyo (JP)

(72) Inventors: Yumi Hirano, Tokyo (JP); Satoko Itaya, Tokyo (JP); Rie Tanaka, Tokyo (JP); Shin Nakamura, Tokyo (JP); Kenichi Maruhashi, Tokyo (JP)

(73) Assignee: NEC Corporation, Tokyo (JP)

( * ) Notice: Subject to any disclaimer, the term of this patent is extended or adjusted under 35 U.S.C. 154(b) by 29 days.

(21) Appl. No.: 15/303,138

(22) PCT Filed: Apr. 6, 2015

(86) PCT No.: PCT/JP2015/001927
§ 371 (c)(1),
(2) Date: Oct. 10, 2016

(87) PCT Pub. No.: WO2015/155978
PCT Pub. Date: Oct. 15, 2015

(65) Prior Publication Data
US 2017/0030607 A1    Feb. 2, 2017

(30) Foreign Application Priority Data
Apr. 11, 2014   (JP) ................................. 2014-081602

(51) Int. Cl.
*G05B 15/02*   (2006.01)
*F24F 11/00*   (2018.01)
(Continued)

(52) U.S. Cl.
CPC .......... *F24F 11/0034* (2013.01); *F24F 11/30* (2018.01); *F24F 11/62* (2018.01);
(Continued)

(58) Field of Classification Search
CPC .. F24F 11/0034; F24F 11/006; F24F 11/0015; F24F 11/0012; F24F 2011/0036;
(Continued)

(56) References Cited

U.S. PATENT DOCUMENTS 6,582,380 B2 * 6/2003 Kazlausky ............ A61B 5/1118
600/595
6,724,159 B2 * 4/2004 Gutta .................. G06K 9/00771
315/292
(Continued)

FOREIGN PATENT DOCUMENTS

JP   2012-137808 A    7/2012
JP   2012-211722 A    11/2012
(Continued)

OTHER PUBLICATIONS

International Search Report corresponding to PCT/JP2015/001927, dated Jun. 9, 2015 (3 pages).

*Primary Examiner* — Ronald D Hartman, Jr.
(74) *Attorney, Agent, or Firm* — Wilmer Cutler Pickering Hale and Dorr LLP

(57) ABSTRACT

A control device is connected to a facility appliance regulating the environment of an area and to an activity measuring instrument for each activity kind measuring the status of an activity of a person in the area. The control device has: an activity kind determination part determining an activity kind corresponding to a work performed in the area; an activity information acquisition part using the activity measuring instrument corresponding to the determined activity kind to acquire the status of the activity of the person in the area; and an environment control part causing the facility appliance to control the environment of the area on the basis of the acquired status of the activity.

10 Claims, 21 Drawing Sheets

(51) Int. Cl.
    *G06Q 50/16*     (2012.01)
    *F24F 11/30*     (2018.01)
    *F24F 11/62*     (2018.01)
    *F24F 110/10*     (2018.01)
    *F24F 110/20*     (2018.01)
    *F24F 120/10*     (2018.01)
    *F24F 120/14*     (2018.01)
    *F24F 11/63*     (2018.01)
    *F24F 11/46*     (2018.01)

(52) U.S. Cl.
    CPC ............. G05B 15/02 (2013.01); G06Q 50/16 (2013.01); *F24F 11/46* (2018.01); *F24F 11/63* (2018.01); *F24F 2110/10* (2018.01); *F24F 2110/20* (2018.01); *F24F 2120/10* (2018.01); *F24F 2120/14* (2018.01); *G05B 2219/2614* (2013.01); *G05B 2219/2642* (2013.01)

(58) Field of Classification Search
    CPC ...... F24F 2011/0075; F24F 2011/0061; G05B 15/02; G05B 2219/2642; G05B 2219/2614; G06Q 50/16
    See application file for complete search history.

(56) References Cited

U.S. PATENT DOCUMENTS

| | | | | |
|---|---|---|---|---|
| 6,726,113 | B2* | 4/2004 | Guo | F24F 11/0034 236/47 |
| 7,161,483 | B2* | 1/2007 | Chung | H04L 12/2803 340/12.53 |
| 8,712,352 | B2* | 4/2014 | de Clerq | G05B 15/02 340/12.22 |
| 8,819,149 | B2* | 8/2014 | Amidon | H04W 76/02 709/206 |
| 8,909,380 | B2* | 12/2014 | Golding | H05B 37/00 315/149 |
| 8,942,726 | B2* | 1/2015 | de Clercq | G05B 15/02 340/12.52 |
| 9,800,429 | B2* | 10/2017 | Crayford | H04L 12/2803 |
| 9,839,101 | B2* | 12/2017 | Clymer | H05B 37/0272 |
| 2008/0167535 | A1* | 7/2008 | Stivoric | A61B 5/0008 600/301 |
| 2012/0031984 | A1* | 2/2012 | Feldmeier | F24F 11/001 236/49.3 |
| 2012/0313746 | A1* | 12/2012 | Rahman | A61B 5/0024 340/5.1 |
| 2013/0072765 | A1* | 3/2013 | Kahn | A61B 5/01 600/301 |

FOREIGN PATENT DOCUMENTS

| | | | |
|---|---|---|---|
| JP | 5171885 | B2 | 3/2013 |
| JP | 2013-140523 | A | 7/2013 |
| JP | 2013-205916 | A | 10/2013 |
| WO | WO2013001407 | * | 1/2013 ............. F21V 23/04 |

* cited by examiner

FIG. 3

| WORK-RELATED OBJECT | ACTIVITY KIND |
|---|---|
| NEW SERVICE RESEARCH PROPOSAL | MEETING |
| EVALUATION/ VERIFICATION | PROGRAM CREATION |
| ⋮ | ⋮ |

| FACILITY ID | UNIT ID | TEAM ID | AREA ID | ACTIVITY PHASE | WORK-RELATED OBJECT |
|---|---|---|---|---|---|
| HEAD OFFICE | RESEARCH UNIT | TEAM A | AREA 110 | RESEARCH THEME FORMULATION | NEW SERVICE RESEARCH PROPOSAL |
| ⋮ | ⋮ | ⋮ | ⋮ | ⋮ | ⋮ |

FIG. 7
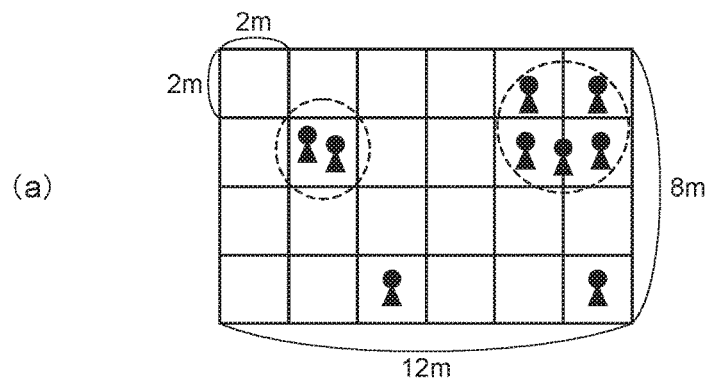
(a)
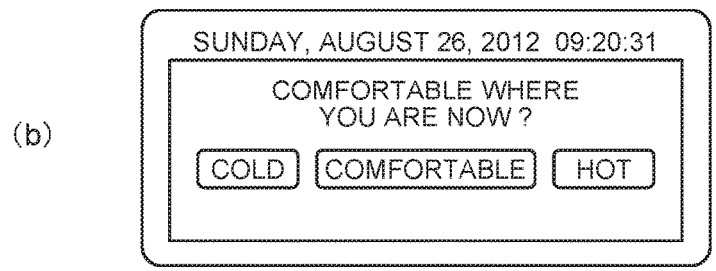
(b)
(c)
|  | DEFINITION | CASE 1 | CASE 2 | CASE 3 |
|---|---|---|---|---|
| N3 | PUSH COLD THREE TIMES OR MORE | 0 | 0 | 0 |
| N2 | PUSH COLD TWO TIMES | 0 | 0 | 0 |
| N1 | PUSH COLD ONE TIME | 0 | 0 | 1 |
| N0 | COMFORTABLE | 0 | 0 | 1 |
| N1 | PUSH HOT ONE TIME | 0 | 0 | 0 |
| N2 | PUSH HOT TWO TIMES | 1 | 0 | 0 |
| N3 | PUSH HOT THREE TIMES OR MORE | 0 | 1 | 0 |

FIG. 9

| | TEMPERATURE | HUMIDITY | AIRFLOW | THERMAL RADIATION | CLOTHING INSULATION | HEAT LOAD | METABOLIC RATE |
|---|---|---|---|---|---|---|---|
| OT | OPERATIVE TEMPERATURE | ○ | | ○ | | | | |
| DI | DISCOMFORT INDEX | ○ | ○ | ○ | | | | |
| ET | EFFECTIVE TEMPERATURE | ○ | ○ | ○ | | | | |
| CET | CORRECTED EFFECTIVE TEMPERATURE | ○ | ○ | ○ | | | | |
| ET* | NEW EFFECTIVE TEMPERATURE | ○ | ○ | ○ | | | | |
| SET* | STANDARD NEW EFFECTIVE TEMPERATURE | ○ | ○ | ○ | ○ | ○ | | |
| PMV | PREDICTED MEAN VOTE | ○ | ○ | ○ | ○ | ○ | ○ | ○ |
| WBGT | WET BULB GLOBE TEMPERATURE | ○ | | | | | | |

FIG. 12

| MANAGER AREA | | RESEARCHER AREA | | | | |
|---|---|---|---|---|---|---|
| MANAGER 1 | MANAGER 2 | RESEARCHER 1 | RESEARCHER 2 | RESEARCHER 3 | RESEARCHER 4 | RESEARCHER 5 |
| 0.333 | 1 | 0.5 | 0.2 | 0.7 | 0.9 | 0.1 |

FIG. 15

| | DATE | DAY OF WEEK | TIME | SET AIR-CONDITIONING TEMPERATURE | WEATHER | SET AIR VOLUME | OUTDOOR TEMPERATURE |
|---|---|---|---|---|---|---|---|
| 1 | 04/26 | MONDAY | 15:00 | 28 | CLOUDY | WEAK | 15 |
| | | TUESDAY | | | | | |
| | | WEDNESDAY | | | | | |
| | | THURSDAY | | | | | |
| | | FRIDAY | | | | | |

| WORK-RELATED GOAL | PRIORITY | WORK EFFICIENCY INDEX | ENVIRONMENT INDICES | PAST CORRELATION COEFFICIENT |
|---|---|---|---|---|
| ① NEW SERVICE RESEARCH PROPOSAL : NUMBER OF PROPOSAL REPORTS | 1 | USE RATE OF MEETING AREA | TEMPERATURE | 0.98 |
| | 2 | NUMBER OF MEETINGS WITH OTHER COMPANY | TEMPERATURE, COLOR OF LIGHT | 0.68 |
| | 3 | INVERSE OF RATIO OF PC KEYBOARD TYPING TIME (BETTER IF LESS) | TEMPERATURE, COLOR OF LIGHT | 0.55 |
| | | ⋮ | | |
| ② EVALUATION/ VERIFICATION : NUMBER OF EVALUATION PAPERS | 1 | NUMBER OF LINES OF PROGRAM FILE (PROGRESS LEVEL OF CODING) | TEMPERATURE, ILLUMINANCE | 0.84 |
| | 2 | PROGRAM CREATION TIME | TEMPERATURE | 0.79 |
| | | ⋮ | | |

(b)

| | NUMBER OF PROPOSAL REPORTS | USE RATE OF MEETING AREA |
|---|---|---|
| 1 | 3 | 0.5 |
| 2 | 7 | 0.8 |
| 4 | 5 | 0.6 |
| 4 | 8 | 0.9 |
| 5 | 1 | 0.4 |
| CORRELATION COEFFICIENT | | 0.98 |

_(1)_

ENVIRONMENT CONTROL SYSTEM

CROSS-REFERENCE TO RELATED APPLICATIONS

This application is a national stage application of International Application No. PCT/JP2015/001927 entitled "Environment Control System" filed on Apr. 6, 2015, which claims the benefit of the priority of Japanese Patent Application No. 2014-081602, filed on Apr. 11, 2014, the disclosures of each of which are hereby incorporated by reference in their entirety.

TECHNICAL FIELD

The present invention relates to an environment control system, a control device, an environment control method, and a program.

BACKGROUND ART

Various kinds of systems that control the environment of an area such as a building by using a facility appliance such as air-conditioning equipment are proposed or practically used.

For example, the following system is proposed as a first related technique relating to the present invention (see Patent Document 1, for example). The system has: an energy adding means for calculating energy used by a used in an area; a comfort level analyzing means for analyzing the comfort level and activity level of the user; and a productivity analyzing means for analyzing the productivity of the user on the basis of the calculated energy and the analyzed comfort level and activity level of the user. The productivity analyzing means controls consumed energy of used equipment such as air-conditioning equipment so as to make the productivity as large as possible with respect to a target energy in the area. According to the first related technique, information including a key input speed of an information processing device used by the user in the area, the frequency of input of Delete key and Back Space key, which represent a failure of input, and the kind of a running application is set as the index of the productivity.

Further, the following system is proposed as a second related technique relating to the present invention (see Patent Document 2, for example). The system distinguishes the use of an area (work, reception, meeting, and the like) and, referring to a use-based control definition table in which the use of the area and the content of control (the criterion values of a cooling temperature and a heating temperature) corresponding to the use are defined, controls the environment of the area.
Patent Document 1: Japanese Unexamined Patent Application Publication No. 2012-211722
Patent Document 2: Japanese Patent Publication No. 5171885

In the first related technique, information such as a key input speed of an information processing device used by a user in an area, the frequency of input of Delete key and Back Space key representing a failure of input and the kind of a running application is set as the index of the productivity, and the environment of the area is controlled so that the productivity becomes as large as possible. However, there are many kinds of works performed in an area, so that the index of the productivity generally varies when a work performed in an area varies. Meanwhile, in the first related technique, a predetermined productivity index is steadily used regardless of a work performed in an area. Therefore, it is difficult to control the environment of an area so as to encourage a work performed in the area.

On the other hand, in the second related technique, the environment is controlled in accordance with the use of an area, so that it is possible to control the environment in accordance with a work performed in the area. However, it is usually difficult to steadily determine in advance an appropriate environment to encourage a work performed in an area for a certain use. Moreover, the appropriate environment may be unsteady and change. Therefore, with environment control according to a control content previously defined in accordance with the use of an area, it is difficult to control the environment of the area so as to encourage a work performed in the area.

SUMMARY

An object of the present invention is to provide an environment control system which solves the abovementioned problem, which is a problem that it is difficult to control the environment of an area so as to encourage a work performed in the area.

An environment control system as an aspect of the present invention has:
 a facility appliance regulating an environment of an area;
 an activity measuring instrument for each activity kind, the activity measuring instrument measuring a status of an activity of a person in the area; and
 a control device connected to the facility appliance and the activity measuring instrument.

The control device has:
 an activity kind determination part determining an activity kind corresponding to a work performed in the area;
 an activity information acquisition part using the activity measuring instrument corresponding to the determined activity kind to acquire the status of the activity of the person in the area; and
 an environment control part causing the facility appliance to control the environment of the area on a basis of the acquired status of the activity.

A control device as another aspect of the present invention is connected to a facility appliance regulating an environment of an area and to an activity measuring instrument for each activity kind measuring a status of an activity of a person in the area.

The control device has:
 an activity kind determination part determining an activity kind corresponding to a work performed in the area;
 an activity information acquisition part using the activity measuring instrument corresponding to the determined activity kind to acquire the status of the activity of the person in the area; and
 an environment control part causing the facility appliance to control the environment of the area on a basis of the acquired status of the activity.

An environment control method as another aspect of the present invention is an environment control method executed by a control device connected to a facility appliance regulating an environment of an area and to an activity measuring instrument for each activity kind measuring a status of an activity of a person in the area.

The environment control method includes:
 determining an activity kind corresponding to a work performed in the area;

using the activity measuring instrument corresponding to the determined activity kind to acquire the status of the activity of the person in the area; and causing the facility appliance to control the environment of the area on a basis of the acquired status of the activity.

A program as another aspect of the present invention includes instructions for causing a computer connected to a facility appliance regulating an environment of an area and to an activity measuring instrument for each activity kind measuring a status of an activity of a person in the area, to function as:

an activity kind determination part determining an activity kind corresponding to a work performed in the area;

an activity information acquisition part using the activity measuring instrument corresponding to the determined activity kind to acquire the status of the activity of the person in the area; and an environment control part causing the facility appliance to control the environment of the area on a basis of the acquired status of the activity.

With the configurations described above, the present invention enables control of the environment of an area so as to encourage a work performed in the area.

BRIEF DESCRIPTION OF DRAWINGS

FIG. 3 is a diagram showing an example of a correspondence table of a work-related goal and the kind of an activity, used by an activity kind determination part in the environment control system according to the first exemplary embodiment of the present invention;

FIG. 4 is a diagram showing an example of a table associating an area and a work-related goal, used by the activity kind determination part in the environment control system according to the first exemplary embodiment of the present invention;

FIG. 7 is a diagram showing an example of acquisition of an index used in the environment control system according to the second exemplary embodiment of the present invention;

FIG. 9 is a diagram showing an example of a temperature index used in the environment control system according to the second exemplary embodiment of the present invention;

FIG. 12 is a diagram showing a specific example of a work efficiency value used in the environment control system according to the fourth exemplary embodiment of the present invention;

FIG. 15 is a diagram showing an example of a table included by an index history analysis part of the environment control system according to the fifth exemplary embodiment of the present invention;

FIG. 20 is a diagram showing an example of a table used by the environment control system according to the seventh exemplary embodiment of the present invention.

EXEMPLARY EMBODIMENTS

Next, exemplary embodiments of the present invention will be described in detail with reference to the attached drawings.

First Exemplary Embodiment

Figure 1:
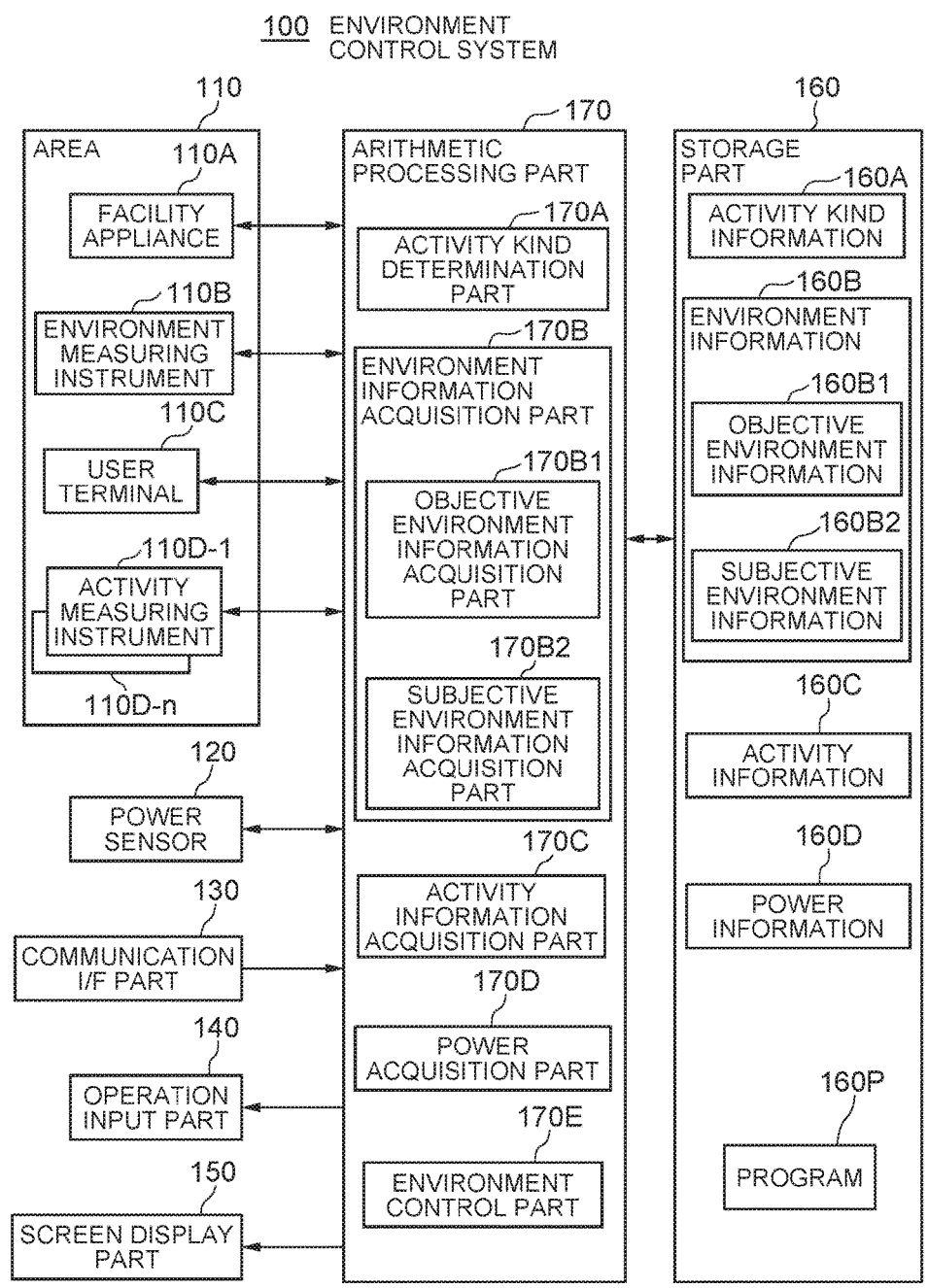
FIG. 1 is a block diagram of an environment control system according to a first exemplary embodiment of the present invention.

Referring to FIG. 1, an environment control system 100 according to a first exemplary embodiment of the present invention is a system which controls the environment of an area 110. The environment control system 100 has a facility appliance 110A, an environment measuring instrument 110B, a user terminal 110C, and an activity measuring instrument 110D, which are placed in the area 110, a power sensor 120, a communication I/F part 130, an operation input part 140, a screen display part 150, a storage part 160, and an arithmetic processing part 170.

The facility appliance 110A has a function of regulating the environment of the area 110. The environment of the area 110 is the temperature, humidity, illuminance and the like of the area 110. The facility appliance 110A is composed of, for example, air-conditioning equipment having a function of regulating temperature and humidity, lighting equipment having a function of regulating illuminance, and the like. The facility appliance 110A has wired or wireless connection to the arithmetic processing part 170, and has a function of operating in accordance with an instruction given by the arithmetic processing part 170 and also notifying the operation status of the facility appliance itself to the arithmetic processing part 170.

The environment measuring instrument 110B has a function of measuring the environment of the area 110. The environment measuring instrument 110B is composed of, for example, a thermometer, a hygrometer, an illuminometer, and the like. The environment measuring instrument 110B has wired or wireless connection to the arithmetic processing part 170, and has a function of notifying the measured environment value to the arithmetic processing part 170.

The user terminal 110C is a terminal operated by a user in the area 110. The user terminal 110C is composed of, for example, a personal computer, a mobile phone, a tablet terminal, or the like. The user terminal 110C is configured to be able to perform wired or wireless communication with the arithmetic processing part 170. The user terminal 110C has a function of inputting a user's evaluation of the environment (for example, hot, cold, comfortable, and so on, with respect to temperature) and notifying the evaluation to the arithmetic processing part 170.

The activity measuring instrument 110D has a function of measuring the activity of a user in the area 110. The activity measuring instrument 110D is prepared for each kind of activity (n kinds). For example, the activity measuring instrument 110D includes an activity measuring instrument 110D-1 that measures an activity of typing on a PC keyboard, an activity measuring instrument 110D-2 that measures the progress of an activity of creating a program, an activity measuring instrument 110D-3 that measures the status of an activity of meeting, and the like. The activity measuring instrument 110D has wired or wireless connection to the arithmetic processing part 170, and has a function of operating in accordance with an instruction given by the arithmetic processing part 170 and communicating information of the measured activity to the arithmetic processing part 170.

The power sensor 120 has a function of measuring power supplied to the area 110. The power sensor 120 has wired or wireless connection to the arithmetic processing part 170, and has a function of notifying information of the measured power to the arithmetic processing part 170.

The communication I/F part 130 is formed of a dedicated data communication circuit, and has a function of performing data communication with various devices connected via communication lines.

The operation input part 140 is formed of an operation input device such as a keyboard and a mouse, and has a function of detecting operation by the user and outputting to the arithmetic processing part 170.

The screen display part 150 is formed of a screen display device such as a LCD (Liquid Crystal Display) and a PDP (Plasma Display Panel), and has a function of displaying various kinds of information on a screen in accordance with an instruction from the arithmetic processing part 170.

The storage part 160 is formed of a storage device such as a hard disk and a memory, and has a function of storing process information and a program 160P, which are necessary for various processes by the arithmetic processing part 170. The program 160P, which is a program loaded and executed by the arithmetic processing part 170 to realize various processing parts, is previously loaded from an external device (not shown in the drawings) or a storage medium (not shown in the drawings) via a data input/output function like the communication I/F part 130, and stored into the storage part 160. Major process information stored in the storage part 160 is activity kind information 160A, environment information 160B, activity information 160C, and power information 160D.

The activity kind information 160A is information showing the kind of an activity to be actually measured among activities of the user in the area 110. For example, if the status of a meeting as an activity is the target of measurement, the activity kind information 160A shows a meeting as an activity.

The environment information 160B is information showing the environment of the area 110. The environment information 160B is composed of objective environment information 160B1 and subjective environment information 160B2. The objective environment information 160B1 is information showing the environment of the area 110 measured with the environment measuring instrument 110B. The subjective environment information 160B2 is information showing an evaluation of the environment by the user notified by the user terminal 110C.

The activity information 160C is information of an activity of the user in the area 110, measured with the activity measuring instrument 110D.

The power information 160D is information of power supplied to the area 110, measured with the power sensor 120.

The arithmetic processing part 170 has a microprocessor like an MPU and a peripheral circuit thereof, and has a function of loading the program 160P from the storage part 160 and executing the program 160P, thereby causing the abovementioned hardware and the program 160P to cooperate to realize various processing parts. Major processing parts realized by the arithmetic processing part 170 are an activity kind determination part 170A, an environment information acquisition part 170B, an activity information acquisition part 170C, a power acquisition part 170D, and an environment control part 170E.

The activity kind determination part 170A has a function of determining the kind of an activity corresponding to a work performed in the area 110 and storing it as the activity kind information 160A into the storage part 160.

The environment information acquisition part 170B has a function of acquiring information of the environment of the area 110. The environment information acquisition part 170B includes an objective environment information acquisition part 170B1 and a subjective environment information acquisition part 170B2. The objective environment information acquisition part 170B1 has a function of acquiring information of the environment measured with the environment measuring instrument 110B and storing it as the objective environment information 160B1 into the storage part 160. The subjective environment information acquisition part 170B2 has a function of storing information of a user's evaluation of the environment notified by the user terminal 110C as the subjective environment information 160B2 into the storage part 160.

The activity information acquisition part 170C has a function of retrieving the activity kind information 160A from the storage part 160, acquiring information of a user's activity in the area 110 by using the activity measuring instrument 110D corresponding to the kind of an activity shown by the retrieved activity kind information 160A, and storing the information as the activity information 160C into the storage part 160. For example, in a case where the activity kind information 160A shows a meeting as an activity, the activity information acquisition part 170C acquires information of the user's activity in the area 110 by using the activity measuring instrument 110D-3 that measures the status of a meeting. Moreover, in a case where the activity kind information 160A shows both a meeting and PC keyboard typing, the activity information acquisition part 170C acquires information of the user's activity in the area 110 by using the activity measuring instrument 110D-3 that measures the status of a meeting and the activity measuring instrument 110D-1 that measures the status of typing.

The power acquisition part 170D has a function of acquiring from the power sensor 120 information of power supplied to the area 110, and storing the information as the power information 160D into the storage part 160.

The environment control part 170E has a function of retrieving the objective environment information 160B1, the subjective environment information 160B2, the activity information 160C and the power information 160D from the storage part 160, and causing the facility appliance 110A to control the environment of the area 110 on the basis of the retrieved information. The environment control part 170E may be configured to cause the facility appliance 110A to control the environment of the area 110 on the basis of the activity information 160C, or may be configured to by using the facility appliance 110A to control the environment of the area 110 by using one, two or all of the activity information 160C, the objective environment information 160B1, the subjective environment information 160B2 and the power information 160D.

Figure 2:
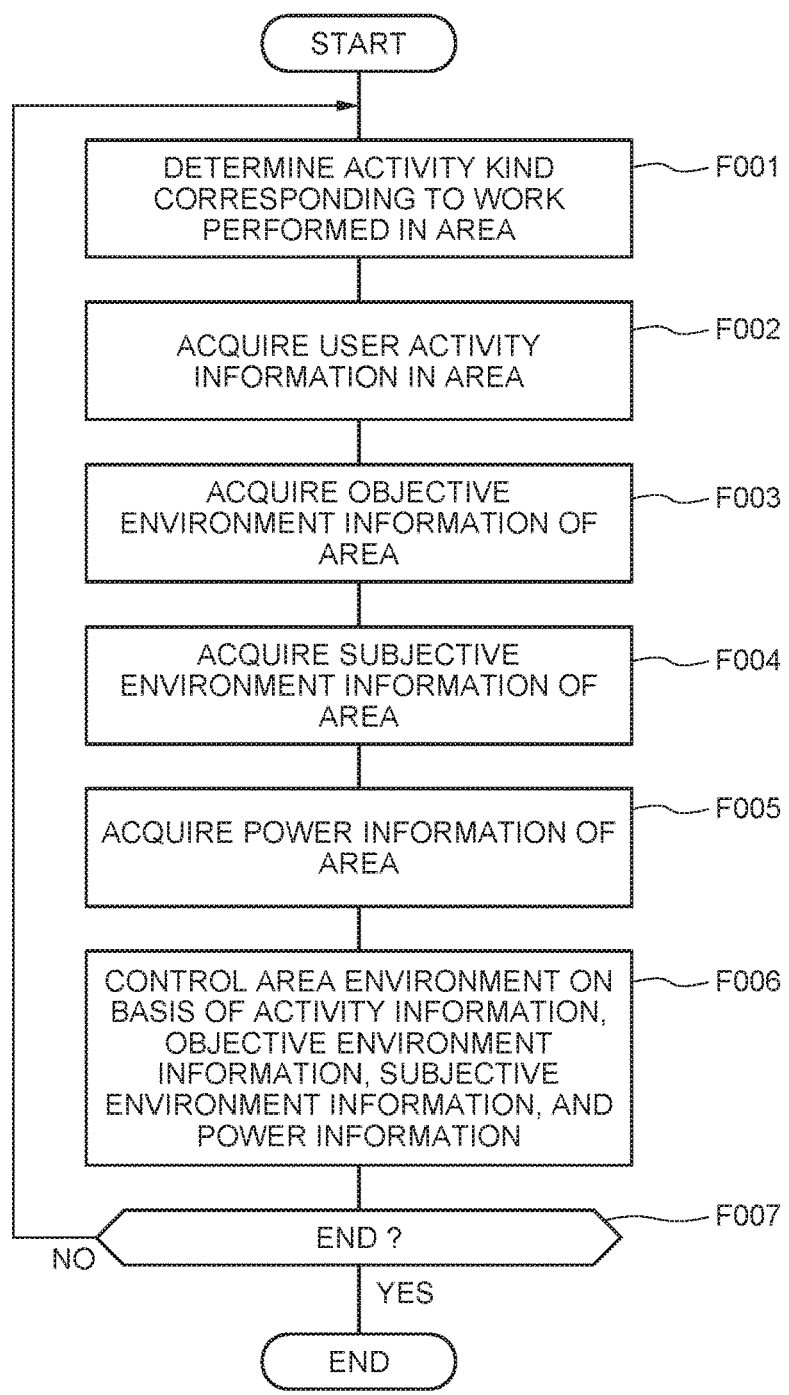
FIG. 2 is a flowchart showing an example of the operation of the environment control system according to the first exemplary embodiment of the present invention.

FIG. 2 is a flowchart showing an example of the operation of the environment control system 100. Referring to FIGS. 1 and 2, the operation of the environment control system 100 will be described below.

The arithmetic processing part 170 of the environment control system 100 starts executing a process shown by the flowchart of FIG. 2, for example, when a start instruction is input from the operation input part 140. First, the activity kind determination part 170A determines the kind of an activity corresponding to a work performed in the area 110, and stores the activity kind as the activity kind information 160A into the storage part 160 (F001).

Next, the activity kind acquisition part 170C regularly acquires information of the user's activity in the area 110 by using the activity measuring instrument 110D corresponding to the activity kind shown by the activity kind information 160A, and stores the information as the activity information 160C into the storage part 160 (F002).

Next, the objective environment information acquisition part 170B1 of the environment information acquisition part 170B measures information of the environment of the area 110 by using the environment measuring instrument 110B, and stores the information as the objective environment information 160B1 into the storage part 160 (F003). Further, the subjective environment information acquisition part 170B2 acquires evaluation information with respect to the environment of the user in the area 110 by using the user terminal 110C, and stores the evaluation information as the subjective environment information 160B2 into the storage part 160 (F004).

Next, the power acquisition part 170D measures energy supplied to the area 110, and stores it as the power information 160D into the storage part 160 (F005).

Next, the environment control part 170E controls the environment of the area 110 by using the facility appliance 110A on the basis of the activity information 160C, the objective environment information 160B1, the subjective environment information 160B2, and the power information 160D (F006).

The arithmetic processing part 170 of the environment control system 100 determines whether or not an end instruction is input from the operation input part 140 (F007) and, in a case where an end instruction is input, ends the process shown in FIG. 2. In a case where an end instruction is not input, the arithmetic processing part 170 returns to step F001 and repeats the same process as described above.

Thus, according to this exemplary embodiment, it is possible to control the environment of the area 110 so as to encourage a work performed in the area 110. This is because the activity kind determination part 170A determines the kind of an activity corresponding to a work performed in the area 110, the activity information acquisition part 170C acquires information of the user's activity in the area 110 by using the activity measuring instrument 110D corresponding to the determined activity kind, and the environment control part 170E controls the environment of the area 110 on the basis of the acquired information of the activity.

Next, the details of the activity kind determination part 170A will be described.

FIG. 3 shows an example of a correspondence table 170A1 of a work-related goal and the kind of an activity, used by the activity kind determination part 170. The correspondence table 170A1 holds a record of a correspondence relation between the goal of a work performed in the area 110 and the kind of an activity contributing to achievement of the work-related goal. For example, information on the first row is a record that when the goal of a work performed in the area 110 is "proposal for new service research," the kind of an activity contributing to achievement of the goal is "meeting." Moreover, information on the second row is a record that when the goal of a work performed in the area 110 is "evaluation/verification," the kind of an activity contributing to achievement of the goal is "creation of program."

At step F001, the activity kind determination part 170A receives an entry of the goal of a work performed in the area 110 from an operator through the operation input part 140, and refers to the correspondence table 170A1 shown in FIG. 3 to determine the kind of an activity corresponding to the input work-related goal as the kind of an activity corresponding to the work performed in the area 110.

Although the goal of a work performed in the area 110 is input by the operator in the above example, the goal of a work performed in the area 110 may be automatically acquired by referring to information which associates an area with a work-related goal. FIG. 4 shows an example of a table 170A2 that associates an area with a work-related goal. The table 170A2 holds a record of association of a facility ID, a unit ID, a team ID, an area ID, an activity phase, and a work-related goal. A facility ID is information which identifies a building. A unit ID is information which identifies a unit that operates in the building. A team ID is information which identifies a team in the unit. An area ID is information which specifies an area used by the team. An activity phase is information which shows a current activity phase of the team. A work-related goal is a work-related goal in the activity phase. For example, the information on the first row shows: a team A of the research unit of the head office uses the area 110; the team A is currently in a research theme creation phase; and their work-related goal is proposal for new service research. Furthermore, another column, for example, a column showing a job position may be added to the table 170A2.

The activity kind determination part 170A searches the table 170A2 with the ID of the area 110 as a search key, thereby acquiring a work-related goal corresponding to the area 110. After that, the activity kind determination part 170A refers to the correspondence table 170A1 to determine the kind of an activity.

Meanwhile, by integrating the table shown in FIG. 3 and the table shown in FIG. 4, a table which associates an area ID with the kind of an activity corresponding to a work performed in the area (not shown in the drawings) may be used. In this case, the activity kind determination part 170A refers to the abovementioned table to determine the kinds of an activity corresponding to a work performed in the area.

Next, the details of the environment control part 170E will be described.

Figure 5:
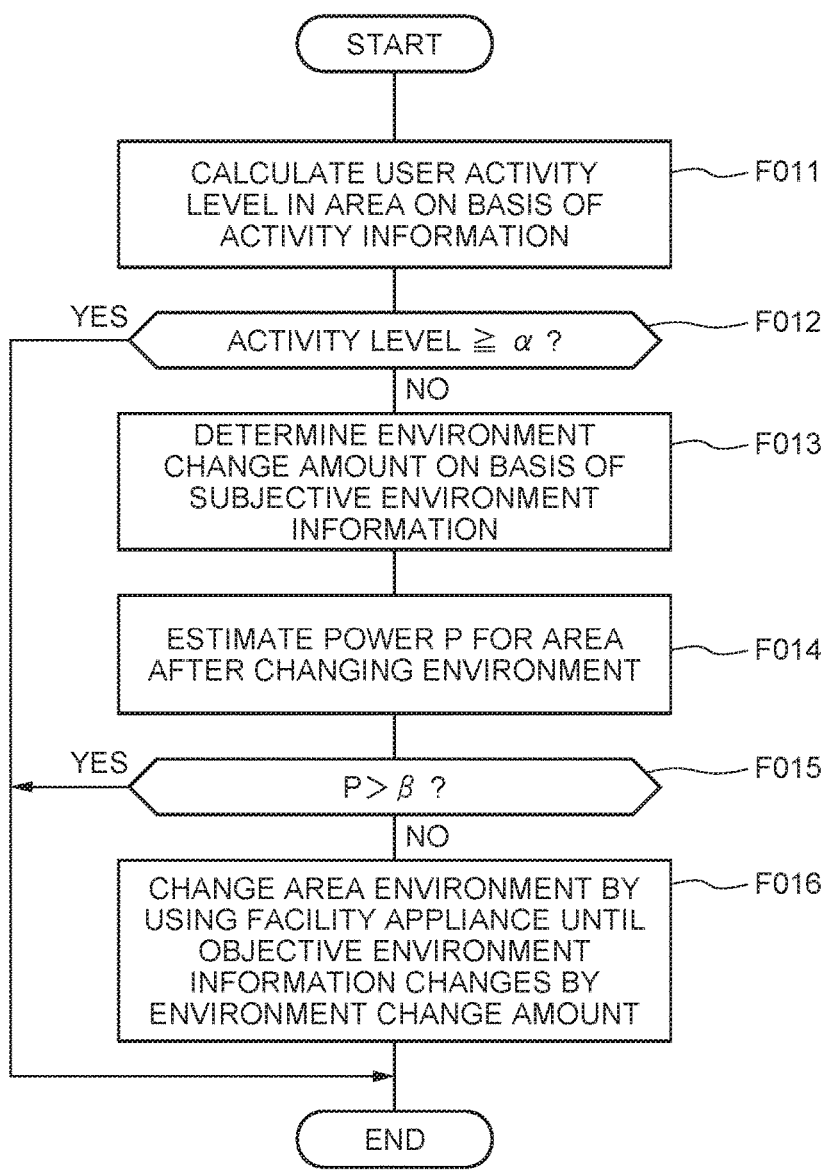
FIG. 5 is a flowchart showing an example of a process by an environment control part in the environment control system according to the first exemplary embodiment of the present invention.

FIG. 5 is a flowchart showing an example of a process executed by the environment control part 170E. The environment control part 170E executes the process shown in FIG. 5 at step F006 of FIG. 2. First, the environment control part 170E calculates an activity level of the user in the area 110 on the basis of the activity information 160C (F011). An activity level is obtained by quantifying the level of an activity of the user. An activity level is a larger value as the level of an activity is larger. A method of calculating an activity level from the activity information 160C can be any method. For example, in the case of typing, an activity level can be the amount of typing per unit time. Moreover, in the case of meeting, an activity level can be the number of meetings or the length of time of a meeting per unit time.

Next, the environment control part 170E determines whether or not the activity level is equal to or more than a threshold $\alpha$ (F012). In a case where the activity level is equal to or more than the threshold $\alpha$, a vigorous activity is performed, so that the environment control part 170E ends the process shown in FIG. 5. On the other hand, in a case where the activity level is less than the threshold $\alpha$, the environment control part 170E changes the environment of the area 110 for encouragement of the activity of the user in the area 110.

First, the environment control part 170E determines the amount of change of the environment of the area 110 on the basis of the subjective environment information 160B2 (F013). The amount of change of the environment includes the direction and amount of change of the environment. For example, in the case of the temperature of the area 110, the environment control part 170E determines what degree of temperature should be decreased or increased. A criterion to be used for determination of the amount of change of the environment may be changing a given amount in a direction of improving the user's evaluation of the environment in the subjective environment information 160B2. For example, in the case of the temperature of the area 110, the environment control part 170E increases the temperature by a given amount in a case where an evaluation as cold is more than the other evaluations in the subjective environment information 160B2. On the contrary, the environment control part 170E decreases the temperature by a given amount in a case where an evaluation as hot is more than the other evaluations in the subjective environment information 160B2. Alternatively, a criterion to be used may be, in a case where an evaluation as comfortable is more than the other evaluations in the subjective environment information 160B2, determining that the comfortableness has not necessarily contributed to achievement of a work-related goal and intentionally decreasing or increasing the temperature.

Next, the environment control part 170E estimates necessary power P for the area 110 after changing the environment (F014). In general, in a case where the scale and structure of the area 110 are settled, necessary power to keep the temperature and the like of the area 110 to a certain value can be estimated in advance.

Next, the environment control part 170E determines whether or not the necessary power P exceeds a threshold $\beta$ (F015). In a case where the necessary power P exceeds the threshold $\beta$, the environment control part 170E abandons change of the environment, and ends the process shown in FIG. 5. On the other hand, in a case where the necessary power P does not exceed the threshold $\beta$, the environment control part 170E monitors the environment measured with the environment measuring instrument 110B, and changes the environment of the area 110 by using the facility appliance 110A until the objective environment information changes by the change amount (F016). Then, the environment control part 170E ends the process shown in FIG. 5.

Although the configuration and operation of this exemplary embodiment are described above, this exemplary embodiment can be modified and changed in various manners. For example, there may be a plurality of areas 110. Moreover, although user's activity information, objective environment information and subjective environment information measured in the area 110 are used without being changed in environment control in this exemplary embodiment, the environment of the area 110 may be controlled on the basis of a predetermined index which is derived from user's activity information, objective environment information and subjective environment information, as described in another exemplary embodiment later.

For describing the other exemplary embodiment, an index will be described below.

An environment control process based on an index is: selecting some indices in accordance with a target environment and the purpose of a work; setting the criteria of the respective indices necessary for determination of the achievement status of a work-related goal; performing evaluation based on the index criteria; evaluating total productivity on the basis of the index evaluation; and consequently, performing control of the environment. In other words, a productivity index is composed of some indices, and these indices are combined to evaluate productivity.

A description of an index will be made below in order of: a characteristic and requirement which an index should have; a design principle of a productivity index; an index criterion determination method and an index evaluation process; a first index, or an objective environment index; a method for quantifying an objective environment index; a second index, or a subjective environment index; a method for quantifying a subjective environment index; a third index, or a work efficiency index; a method for quantifying a work efficiency index; a method for evaluating productivity from an index calculation value; a method for calculating an index element weight; a method for calculating a productivity index evaluation value; correction of a productivity index component; a method for using an index; an effect of an index; a relation with the other index; and others.

[Characteristic and Requirement which Index should Have]

An index firstly needs to allow its use for environment control in consideration of an object thereof and be able to accurately execute environment control. Moreover, in a case where an index is used for environment control, a numerical value of the index must be determined definitely and easily. A first object of use of an index is use in environment control, but it is desired that an index has a possibility of being applied to another control technique.

[Design Principle of Productivity Index]

In order to satisfy an index design requirement, it is desirable that a productivity index is composed of a plurality of indices. In the case of evaluating by using only a single index, selection of an index criterion is important in order to perform accurate environment control. On the other hand, in a case where a productivity index is composed of too many indices, the relation of the indices becomes too complicated and the indices do not make an accurate difference, so that change of the productivity index becomes complicated and it becomes difficult to control. On the basis of these two design directions, a preferable productivity index for environment control is composed of three element indices, for example. A first element is an objective environment index. A second element is a subjective environment index which relates to a subjective sense felt by a worker (a user) with respect to a controlled environment. A third element is a work efficiency index showing the efficiency of a work by the worker. As a method for quantifying the respective indices, the following two methods are considered: the respective indices are separately calculated and quantified; and the respective indices are quantified under influence of the respective indices.

[Index Criterion Determination Method and Index Evaluation Process]

In determination of the respective indices, an index criterion must be accurately determined in order to accurately evaluate an influence on the environment. Determining an index criterion is determining what measurable amounts of the respective indices are combined and what evaluation equation is used to evaluate. Therefore, an index criterion varies according to a business category, and varies depending on an expectation value which is expected for the business. Thus, at the time of selecting indices, association of the indices with each other is considered, and index criteria are determined so that the selected indices accurately function. Determination of index criteria is the most important. After the criteria are determined, calculation of the respective indices is performed, a productivity index is finally evaluated, and how to control is determined based on the evaluation value.

[First Index: Objective Environment Index]

In order to prepare a work environment and improve the status and condition thereof, firstly, an objective index for improving the environment is necessary. For example, in a case where a work place is an office or the like, parameters showing the status and condition of the environment are the amount of temperature, humidity, wind direction and air volume controlled by air-conditioning equipment, the amount of illumination (intensity, color tone) and daylight (direct light, indirect light), an amount relating to sound such as sound (environmental sound blocking property, transmitting property), environmental sound (sound of water, sound of waves) and music, and what can be perceived with five senses by a person, such as furnishings including house plant, design, interior (wall, ceiling, floor), wall paper, large screen, odor or no odor, and food and drink.

[Method for Quantifying Objective Environment Index]

A preferred example of a method for quantifying the parameter of the status and condition of the environment and calculating an environment evaluation value is a method using temperature as a parameter for indexing, and an equation showing an index is a function including only temperature. Alternatively, it is also possible to use another parameter (humidity, wind direction, air volume) controlled with the air-conditioning equipment.

[Second Index: Subjective Environment Index]

Next, an index for improving motivation of a worker influenced by the environment is necessary. Motivation of a worker for work is related to a subjective reaction of a person influenced by the environment. For example, it is considered to use, as a parameter showing the status and condition of a subjective reaction to the environment, an amount obtained by quantifying comfortableness directly from answers to a questionnaire about the office environment. A questionnaire method may be a written one. Moreover, it is possible to use a result of input into certain software or a terminal device. A subjective reaction may be a subjective view with respect to the objective environment index, or may be a different one.

[Method for Quantifying Subjective Index on Environment]

A method for calculating a subjective evaluation value is determining a parameter from the condition and status of a worker's subjective reaction to the environment and quantifying. The quantifying method may use using an amount of input by a worker without change, or calculating a parameter from an amount of input by a worker. For example, a method of using an input by a worker without change is that a worker answers "hot," "comfortable" or "cold" to a questionnaire or enters a reaction "hot," "comfortable" or "cold" by using an input device with respect to a temperature environment and quantifying answers or entries to quantify a subjective index. Alternatively, it can also be considered to use a method that, instead of using the content of the answers or inputs, a worker uses, as a parameter, secondary information or meta information of the information, such as time of the answers, interval of the inputs or the like.

[Third Index: Work Efficiency Index]

Improvement of a work environment must result in increase of work efficiency, and finally, increase of productivity. It is desired that the condition gets better, for example, more earnings, more operations, more cost reduction, and the like. However, there are various kinds of operations and works performed in work environments and, in order to more precisely promote the efficiency of a target work, there is a need to design a work efficiency index in consideration of the content, quality and amount of the work and assess a work efficiency criterion. A work efficiency index is determined on the basis of an activity which largely contributes to achievement of a work-related goal of a worker. The content of the activity and the efficiency index are not one, and are determined depending on a unit, the type or post of a job, and the phase of a work. A work efficiency index is equivalent to the activity kind in the first exemplary embodiment.

[Method for Quantifying Work Efficiency Evaluation]

Calculation of an index criterion value for evaluating work efficiency is performed on the basis of a work efficiency assessment criterion by using a measurement quantity with respect to the criterion.

[Method for Evaluating Productivity from Index Calculation Value]

Although the indices relate to each other, they are defined by methods that can independently quantify as mentioned before. These indices have associations with each other, and correlate with each other. Therefore, in order to finally perform productivity evaluation by using indices, it is important how to combine and use the quantified indices. In order to determine the combination and assess a productivity index, there is a need to decide an index calculation equation. For example, as shown below, a productivity index can be expressed as a function of index calculation values of an objective environment index, a subjective environment index and a work efficiency index:

$$\text{Productivity Index} = \text{Function}(\text{Objective Environment Index Value}, \text{Subjective Environment Index Value}, \text{Work Efficiency Index Value}) \qquad \text{Equation 1.}$$

The form of the function may be the linear combination of index elements, or may be a functional. An example of a preferable form of the function is a linear function in which index elements are weighted. A preferable example thereof will be shown below:

Productivity Index=Σ(Index Weights*Index Values)     Equation 2.

The index values in Equation 2 are an objective environment index value, a subjective environment index value and a work efficiency index value, and Equation 2 is a linear combination function in which the indices are weighted with the index weights, respectively.

[Method for Calculating Index Element Weight]

It is important that the index weight is calculated in association with the importance of an index element in evaluation of the productivity index. A calculation method can be any method of determining a weight for an index element depending on possible importance to a work environment and the content of a work.

[Method for Calculating Productivity Index Evaluation Value]

A productivity index value is calculated by using an index element value and an index element weight. In a preferable example, as shown by Equation 2, a productivity index value is calculated by summing values each obtained by multiplying an index value calculated for each index and an index weight determined for each index.

[Correction of Productivity Index Component]

The level of achievement of a work-related goal is regularly measured, and a work efficiency index, an objective index and a subjective index are reviewed. Moreover, a work efficiency index is revised when a work phase changes or when the level of achievement of a work-related goal is unfavorable.

[How to Use Index]

A productivity index is used to judge whether a productivity demand is satisfied on the basis of the evaluation value of the productivity index. If the productivity demand is satisfied, it means that the environment is favorably controlled. If the productivity demand is not satisfied, a set value of the environment is changed and thereby controlled so that productivity in the work environment increases. In an environment like an office, it is presented as an example to control the settings of air-conditioning equipment, such as temperature and air volume. However, amounts to control vary depending on environments, and there may be a case of controlling the settings other than temperature and air volume.

[Effect of Index]

An index is an index which can control a work environment and increase productivity of a worker working there. As far as an office is concerned, an index can control productivity of an office worker by controlling the temperature, air volume and the like of the air-conditioning equipment.

[Relation with Other Index]

An index is an index for preparing a high-quality environment and performing optimum management for a building owner and a supervisor level, who provide a work environment. An index of high productivity created from a favorable office environment can be given an association with another management index.

[Others]

It is also possible to use the abovementioned supervising index and create a control technology in cooperation with a management tool system used by a building owner, a supervisor and a manager.

Second Exemplary Embodiment

Figure 6:
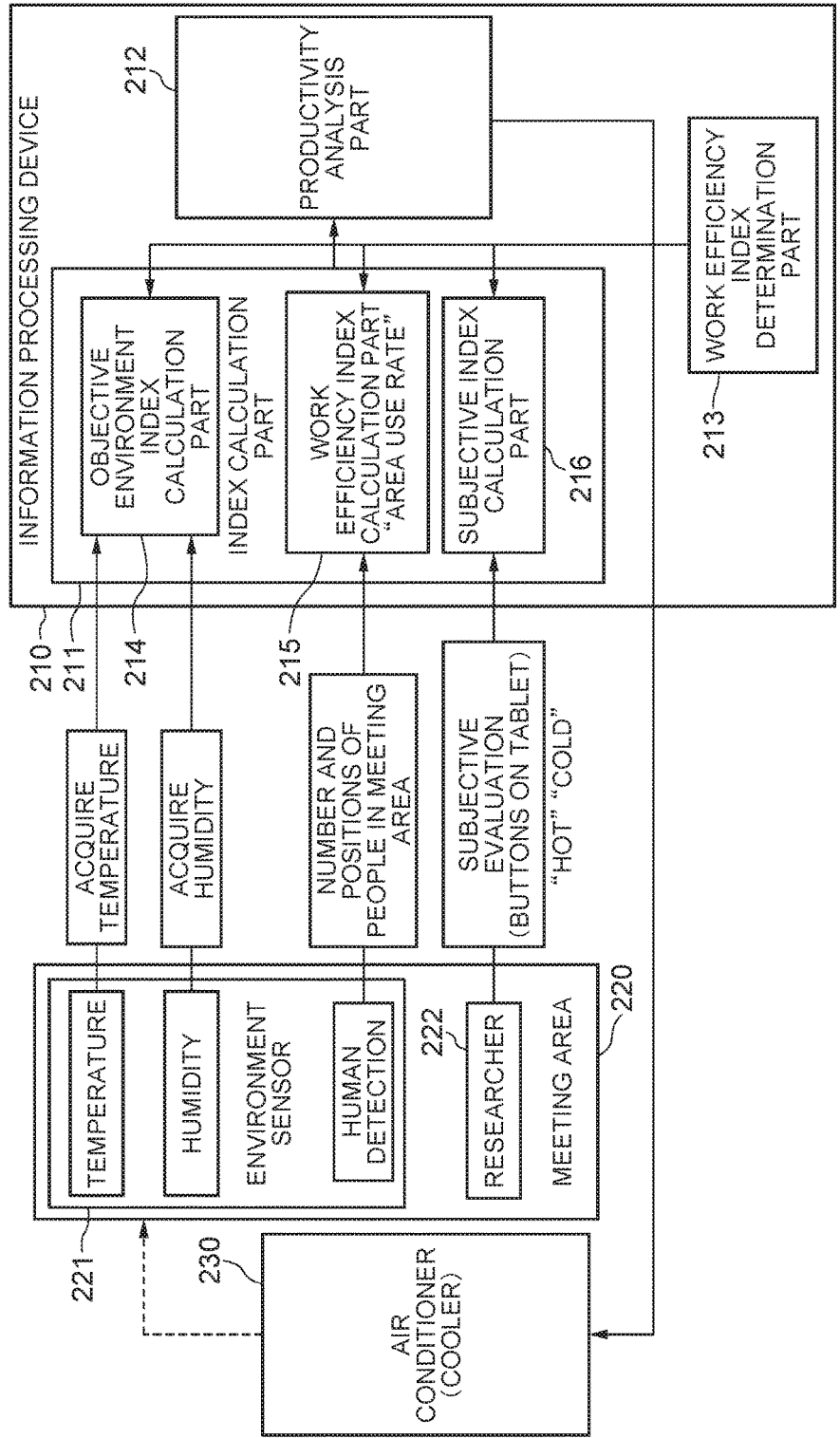
FIG. 6 is a block diagram of an environment control system according to a second exemplary embodiment of the present invention.

FIG. 6 is a block diagram of an environment control system according to this exemplary embodiment. The environment control system according to this exemplary embodiment is a system which controls a cooler of a building which a research institute of a company resides in, and the number of participants in a meeting is determined as a productivity index, which is an index improving the efficiency of intellectual production for researchers.

Referring to FIG. 6, the environment control system according to this exemplary embodiment has an information processing device 210 and an air conditioner 230 which cools a meeting area 220. Further, in the meeting area 220, an environment sensor (temperature sensor, humidity sensor, human body detection sensor) 221 and a terminal 222 operated by a researcher are arranged. Each has a function as described below.

The information processing device 210 is a device for calculating and outputting a productivity index and also controlling the air conditioner 230. The information processing device 210 has an index calculation part 211 for calculating an index value from objective data like monitoring data and user's subjective data, a productivity analysis part 212 which calculates productivity from an index and outputs the productivity and also controls the air conditioner 230, and a work efficiency index determination part 213 which defines productivity on the basis of a work-related goal before operation. Moreover, the index calculation part 211 has an objective environment index calculation part 214, a work efficiency index calculation part 215, and a subjective index calculation part 216.

The objective environment index calculation part 214 acquires temperature and humidity from the temperature sensor and the humidity sensor arranged in the meeting area 220, and calculates an objective environment index on the basis of a gap from the range of temperature and humidity considered to be comfortable. As one of thermal indices used for calculating an objective environment index, ET* (new effective temperature) is used. Although ET* is used herein, another thermal index may be used. The range of ET* value considered to be comfortable with respect to humidity is reported in a research and the like. For example, according to the model of Kato et al., at 60% humidity in summer, the range from 22.2° C. to 24.5° C. is considered to be a comfortable range. Then, an objective environment index is defined within the range from 0 to 1 on the basis of a gap from the comfortable range as shown below. The index gets closer to 0 as the gap is larger, and gets closer to 1 as the gap is smaller. In other words, it is more comfortable as the index gets closer to 1.

$$\text{Objective Environment Index} = 1 - (22.2 - ET^*)/ET^* \text{ if } ET^* < 22.2° C. \tag{1-1}$$

$$\text{Objective Environment Index} = 1 \text{ if } 22.2° C. \leq ET^* < 24.5° C. \tag{1-2}$$

$$\text{Objective Environment Index} = 1 - (ET^* - 24.5)/24.5 \text{ if } 24.5° C. < ET^* \tag{1-3}$$

For example, in a case where the current room temperature in the meeting area is 28° C., it is 28.5° C. when converted into ET*. The gap between the current temperature and the comfortable temperature defined by the model of Kato et al. is determined as an objective index. In this case, because ET* exceeds 24.5° C. of the comfortable range, ET*=28.5 is assigned to the third equation, and approximately 0.16 is obtained as an objective environment index.

The work efficiency index determination part 213 determines a work efficiency index from a work-related goal and notifies the work efficiency index to the work efficiency index calculation part 215. This exemplary embodiment targets a research unit, so that a work-related goal herein is a proposal for new research. For a proposal for new research, creation of an idea dominates a significant portion. Members know the need for a vigorous discussion among the members to create an idea. Thus, in this exemplary embodiment, the work efficiency index determination part 213 determines to set the use rate of the meeting area 220 as the work efficiency index. Then, the work efficiency index determination part 213 notifies the work efficiency index calculation part 215 that the use rate of the meeting area 220 is the work efficiency index. The meeting area 220 is assumed to be an open space without partitions. As shown in FIG. 7A, for example, the meeting area 220 measures 8 m by 12 m, and the meeting area 220 is divided into twenty-four blocks each measuring 2 m by 2 m. The human sensor is placed in each of the blocks to detect the presence or absence, number and position of people in the block. Cooperation of the human sensors enables measurement of a distance between people even if they are in different blocks. Assuming a discussion is being performed when a distance between two people is equal to or less than two meters, the ratio of the number of blocks where a discussion is being performed is determined as the work efficiency index as shown below:

Work Efficiency Index=Number of Blocks Where Discussion Is Being Performed/Total Number of Blocks  (1-4)

In FIG. 7A, a discussion is being performed in a place enclosed with a dotted line. A worker in a place which is not enclosed cannot detect another worker within two meters, so that a discussion is not being performed. Thus, discussions are being performed in five blocks of the twenty-four blocks, so that the work efficiency index is 5/24=approximately 0.208.

The subjective index calculation part 216 acquires a subjective evaluation result such as hot, cold and comfortable from a researcher. Herein, a researcher in the meeting area pushes a button on a tablet screen as shown in FIG. 7B on the terminal 222, and the subjective index calculation part 216 thereby acquires a subjective evaluation result via a network. Three buttons representing "hot," "comfortable" and "cold" as the perceived room temperature are displayed on the tablet and, when any of the buttons is pushed, a subjective evaluation based on perception is notified to the subjective index calculation part 216 via the network. The subjective index calculation part 216 acquires the number of notifications acquired in a given time and indexes the number. FIG. 7C shows the contents of notifications in three types. For N0, N1, N2 and N3, flags are recorded depending on the number of notifications "hot" or "cold." In Case 1, 1 is set for N2, which is a case where two people pushed "hot" in five minutes, and 0 is set for the others. In Case 2, 1 is set for a case where three or more people pushed "hot." Even if four people or six people pushed "hot," 1 is set for N3. In Case 3, one person pushed "comfortable" and one person pushed "cold" in five minutes. The values of N0 are not used for index calculation, and one of N1, N2 and N3 or a combination thereof is used in the following equation:

Subjective Evaluation Value·Temperature=1−(3*$N$3+ 2*$N$2+3*$N$3)/3*($N$3+$N$2+$N$1)  (1-5).

Regarding each of Cases 1 to 3, the index will be found by using Equation (1-5). Regarding Case 1, the index is 1−(0+2+0)/3*(1+0+0)=approximately 0.33. Regarding Case 2, the index is 1−(3*1+0+0)/3*(1+0+0)=0. Regarding Case 3, the index is 1−(0+0+1)/3*(0+0+1)=⅔=approximately 0.67. The value is 1 in a case where there is no notification and in a case where only the button representing "comfortable" is pushed.

The productivity analysis part 212 receives notification of indices from the respective index calculation parts 214, 215 and 216, and analyzes productivity in the current condition. For example, the productivity analysis part 212 calculates the productivity index every five minutes by assigning to the following calculation equation:

Productivity Index=$we$*Objective evaluation value+ $wh$*Subjective Evaluation Value+$wp$*Work Efficiency Value  (1-6), where we, wh and wp denote weights and are set so as to satisfy we+wh+wp=1. These weights can be changed on the basis of the policy of a supervisor or a building owner. Productivity is the highest when the productivity index is 1 as the maximum value, and productivity is the lowest when the productivity index is 0.

For example, the weights we, wh and wp are set to 0.2, 0.4 and 0.4, respectively, and the objective evaluation value, the subjective evaluation value and the work efficiency value are entered. In a case where the objective evaluation value of temperature is 0.16, the subjective evaluation value in Case 1 is 0.33 and the work efficiency value is 0.208 as mentioned before, respectively, the productivity index is 0.2*0.16+ 0.4*0.33+0.4*0.208=0.2472. In a case where a threshold is sufficiently larger than 0.2472, and in a case where the productivity index is 0.2472, it is determined that productivity is extremely low, and air-conditioning control is performed. In this case, the objective environment index of temperature is high and the subjective evaluation "hot" have been notified, so that it is determined to decrease the set temperature of the cooler by a unit quantity, for example, 1° C.

As mentioned before, the environment sensor 221 is placed in the meeting area 220 as a work place and, for calculation of the three indices, notifies the values measured by the sensors to the index calculation part 211 via the network. Herein, a temperature sensor, a humidity sensor and a human detection sensor are placed, and the values measured thereby are notified to the index calculation part 211. Moreover, a researcher as a worker notifies a subjective evaluation of comfortableness of the environment perceived by himself/herself to the index calculation part 211 through the terminal 222 such as a PC and a tablet.

The air conditioner 230 is equipment which controls the environment to increase work efficiency. This exemplary embodiment shows a case of summer time, so that the air conditioner 230 operates in the cooler mode. When the productivity index is 0.247 as mentioned above, the air conditioner 230 receives notification of decrease of the temperature by 1° C. from the productivity analysis part 212 and decreases the set temperature of the cooler from 28.0° C. to 27.0° C.

Figure 8:
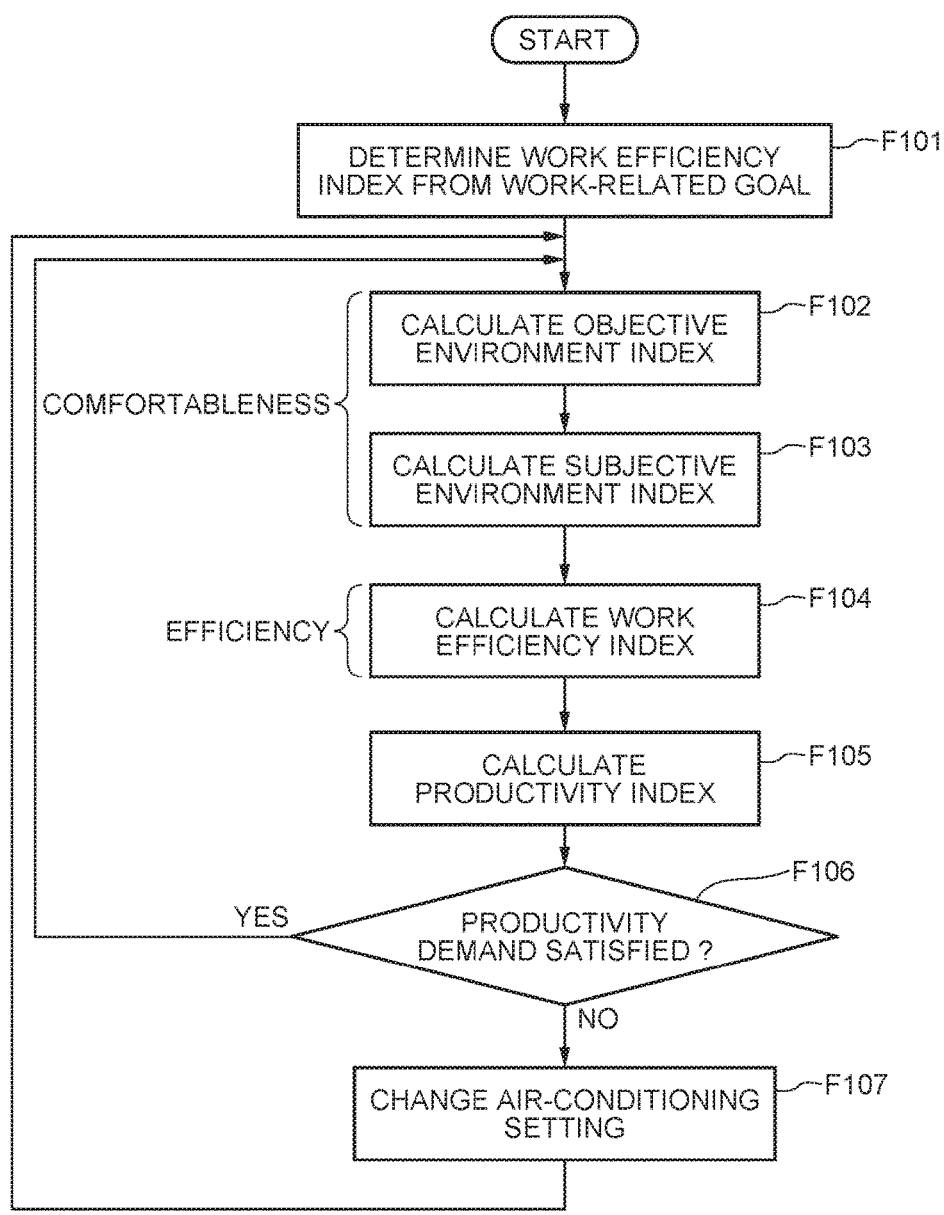
FIG. 8 is a flowchart showing an example of the operation of the environment control system according to the second exemplary embodiment of the present invention.

FIG. 8 is an operation flowchart of the environment control system according to this exemplary embodiment. Referring to FIG. 8, firstly, before operation of productivity index evaluation, the work efficiency index determination part 213 determines a work efficiency criterion on the basis of a work-related goal of a researcher (F101). For example, the work efficiency index determination part 213 determines a work efficiency criterion at the timing of decision of a work-related goal, such as the beginning of a day, the beginning of a week or Monday morning, the beginning of a quarter and the beginning of a year. Herein, the work efficiency index determination part 213 sets the level of vigorousness of a discussion by researchers as an index, acquires the number of people per unit area of the meeting area 220, and calculates the work efficiency index. Therefore, the work efficiency index calculation part 215 of the information processing part 210 determines to acquire information of the area and the number of people from the human detection sensor placed in the meeting area 220.

The operation thereafter is an actual operation procedure, and objective evaluation calculation is performed first (F102). In the objective evaluation calculation, the objective environment index calculation part 214 acquires values from the temperature sensor and the humidity sensor, and calculates the objective environment index by the abovementioned method. Next, for calculation of the subjective environment index, the subjective index calculation part 216 has the researcher input a subjective view on the PC or the tablet, acquires the value via the network, and calculates the subjective environment index by the abovementioned method (F103). The objective environment index and the subjective environment index are indices of comfortableness of the user. Further, the work efficiency index calculation part 215 calculates the work efficiency index (F104). The work efficiency index is a portion showing the efficiency of productivity.

Next, the productivity analysis part 212 calculates the overall productivity from the three indices (F105). Herein, productivity is quantified by using Equation (1-6). On the basis of the obtained value, the productivity analysis part 212 determines whether or not the productivity satisfies a demand criterion (F106). For example, assuming a demand value (a threshold) is 0.75, the productivity analysis part 212 determines that the demand is not satisfied when the result of Equation (1-6) is 0.6, and determines that the demand is satisfied when the result is 0.8. In a case where the productivity analysis part 212 determines that the request is satisfied, the system repeatedly executes the flow of evaluation of comfortableness and productivity. In a case where the productivity is 0.247 as in the abovementioned example, the demand is not satisfied, so that the system shifts to a flow of change of air-conditioning setting (F107). If many evaluations represent "hot" according to the subjective views and the objective index, the system changes the setting, for example, decreases the set air-conditioning temperature by 1° C. and, in order to check an influence thereby, continues the evaluation flow (F102 to F106).

Thus, in this exemplary embodiment, by evaluating the productivity by using not only comfortableness but also work efficiency corresponding to a work-related goal as the indices, and controlling the environment of the area (building), it is possible to increase the productivity more appropriately for an object. Moreover, according to this exemplary embodiment, in environment control based on a plurality of indices, it is possible to change the balance of the indices. This is because an overall index value is calculated from a plurality of index values and weights for the respective index values and the air conditioner is controlled on the basis of the overall index value. For example, air-conditioning control can be performed in the following manner: assuming we=1, wh=0 and wp=0, it is possible to perform air-conditioning control largely dependent on the objective index; assuming we=0, wh=1 and wp=0, it is possible to perform air-conditioning control largely dependent on the subjective index; and assuming we=0, wh=0 and wp=1, it is possible to perform air-conditioning control largely dependent on the work efficiency. In a case where values other than the values 0 and 1 shown above are set, which is an extreme example, it is possible to perform control based on a balance corresponding to the set values.

Although ET* (new effective temperature) is used as the objective environment index for temperature in the above description, this is not a limitation. FIG. 9 shows an example of other objective indices for temperature. By acquiring humidity, airflow, thermal radiation, clothing insulation, heat load and metabolic rate in addition to temperature for each index, the objective environment index may be estimated.

Further, although the set temperature of the cooler is controlled in this exemplary embodiment, the set air volume may be controlled instead. Alternatively, the set humidity may be controlled, and any facility appliance that has an influence on the sense of hot and cold can be used.

Further, as the facility appliance that has an influence on work efficiency, a light (lighting equipment) may be used. In this case, illuminance information is acquired from an illuminance sensor, and subject evaluation such as light/dark and easy to see/hard to see is notified. Thus, it is possible to apply any facility appliance that has an influence on the five senses of a worker other than an air conditioner and a light, and it is possible to change subjective evaluation in accordance with the facility appliance.

Further, although the use rate of the meeting area is used as the work efficiency index for the research unit, this is not a limitation. A change with time of the number of people in the meeting area may be measured, or the length of time of a meeting may be measured. In a manner that the level of vigorousness of a discussion is determined high when the motion of participant's arms and legs is large, the level of the motion may be used as the work efficiency index. Moreover, in a case where the research unit is mature in the aspect of technology and commercialization is an issue, the frequency of meeting with a business unit may be used as the work efficiency index. Other than those mentioned above, anything that shows the efficiency of a specific work item for achieving a work-related goal may be used.

Although the tablet is used only for notifying the perception of temperature in FIG. 7B, the result of calculation of each index may be displayed on the tablet. Then, the supervisor of power equipment like the air conditioner, who sees the screen, may actually execute control on the air conditioner. Other than those mentioned above, the setting of the air conditioner, the used energy, the status of power saving, temperature, humidity, illuminance, the number of people in the area and the like may be displayed on the tablet.

Although a goal of productivity enhancement is set to achievement of a work in an office building in this exemplary embodiment, the goal is not limited to a work. For example, the goal may be set to achievement of any activity in a facility, such as learning and a club activity in an educational facility, the satisfaction level of visitors and sales in an event site, an amusement facility or an accommodation, sales at a shop or the like in a commercial facility, the happiness level of residents in an apartment, an activity at a community center or a library, and job performance in a medical facility.

Third Exemplary Embodiment

Figure 10:
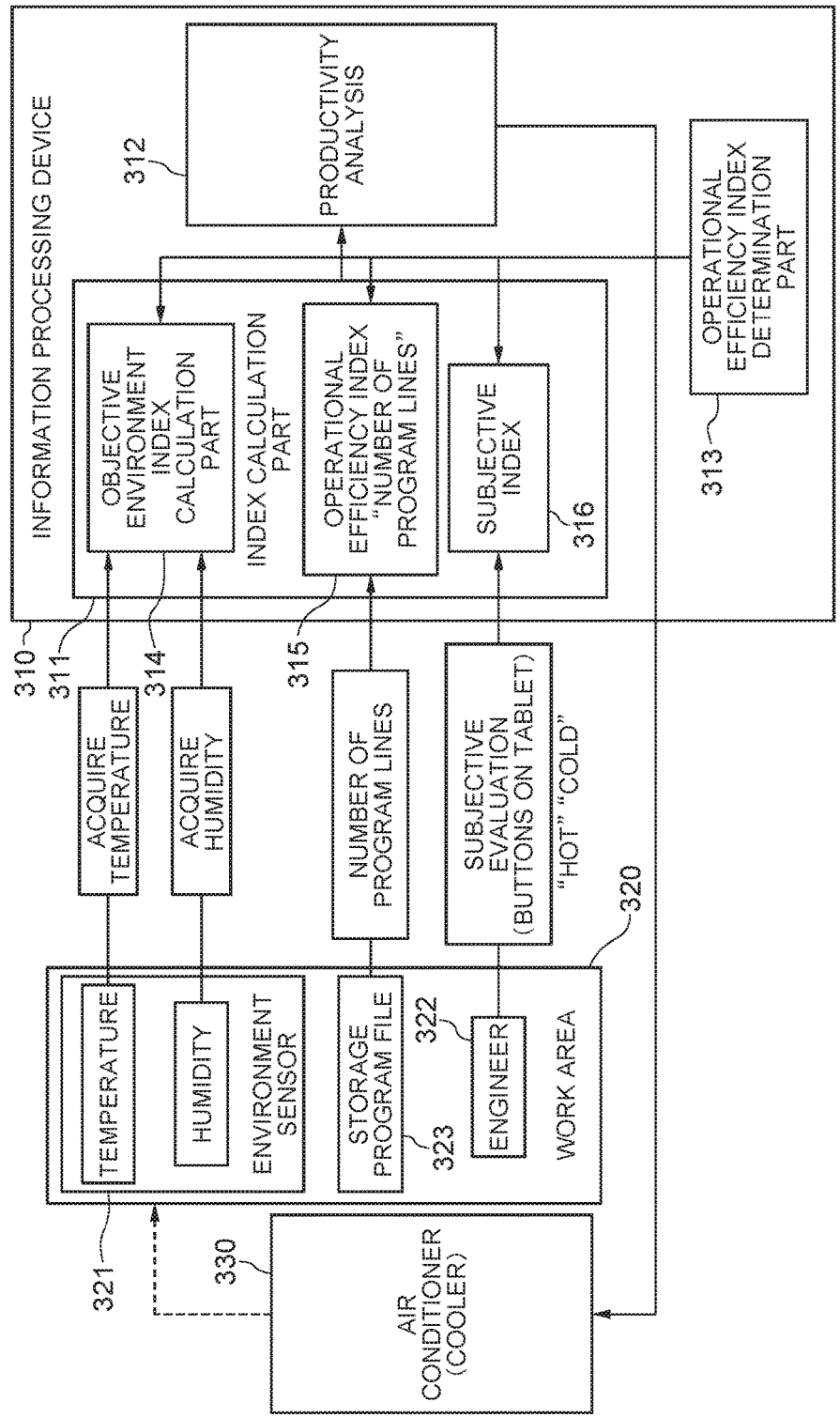
FIG. 10 is a block diagram of an environment control system according to a third exemplary embodiment of the present invention.

FIG. 10 is a block diagram of an environment control system according to this exemplary embodiment. The environment control system according to this exemplary embodiment controls a cooler of a building where a system engineering unit creating a calculation program for a company resides on the basis of productivity evaluation in the system engineering unit. It is assumed herein that the unit accepts an order of creation of a program based on specifications for productization and they are in the initial stage of the program creation at present. Therefore, their work-related goal is the level of progress of prototyping of the program. Then, on the basis of the work-related goal, the number of lines of a program file is set as the work efficiency index.

Referring to FIG. 10, the environment control system according to this exemplary embodiment has an information processing device 310, and an air conditioner 330 that cools a work area. Moreover, an environment sensor (temperature sensor, humidity sensor) 321 that detects temperature and humidity, a terminal 322 operated by an engineer, and a storage 323 that stores a program file are present in the work area 320.

The information processing device 310 is a device for calculating and outputting a productivity index and also controlling the air conditioner 330. The information processing device 310 has an index calculation part 311 for calculating an index value from objective data like monitoring data and user's subjective data, a productivity analysis part 312 that calculates and outputs productivity from an index and also controls the air conditioner 330, and a work efficiency index determination part 313 that defines productivity on the basis of a work-related goal before operation. Moreover, the index calculation part 311 has an objective environment index calculation part 314, a work efficiency index calculation part 315, and a subjective index calculation part 316. These parts have the same functions as the index calculation part 211, the productivity analysis part 212, the work efficiency index determination part 213, the objective environment index calculation part 214, the work efficiency index calculation part 215 and the subjective index calculation part 216 in the second exemplary embodiment. Below, a description will be made focusing on a different point from the second exemplary embodiment.

The work efficiency index determination part 313 determines the number of program lines as the work efficiency index on the basis of a work-related goal, and notifies to the work efficiency index calculation part 315. The work efficiency index calculation part 315 acquires data of the number of program lines from a program file in the storage 323, and notifies the data to the productivity analysis part 312. Acquisition of the data of the number of program lines is executed by, for example, acquiring a number-of-lines n from a target program file in the storage 323 and causing the notification program to operate. The work efficiency index can be calculated in the following manner. The work efficiency index is calculated by setting a target number-of-program-lines N and using the following equations with the value:

Work Efficiency Index=1−(N−n)/N if N>n     (2-1)

Work Efficiency Index=1 if N≥n     (2-2).

For example, assuming the target number of lines is 100, in a case where the acquired data of the number of lines is 50, calculation is performed by using Equation (2-1), and the work efficiency index 0.5 is thereby obtained. Productivity evaluation thereafter is performed by using Equation (1-6) as in the second exemplary embodiment. Moreover, air-conditioning control and the like are also executed as in the second exemplary embodiment.

Although the number of lines of a program file is used as the work efficiency index in the above description, the number of lines added per unit time may be used. Besides, the work efficiency index may be changed with the progress of a work process.

Thus, according to this exemplary embodiment, by setting the work efficiency index in accordance with the content of a work and a work process in the system engineering unit, it is possible to more accurately evaluate productivity and use in achievement of a work-related goal.

Although a goal of productivity enhancement is set to achievement of a work in an office building in this exemplary embodiment, the goal is not limited to a work. For example, the goal may be set to achievement of any activity in a facility, such as learning and a club activity in an educational facility, the satisfaction level of visitors and sales in an event site, an amusement facility or an accommodation, sales at a shop or the like in a commercial facility, the happiness level of residents in an apartment, an activity at a community center or a library, and job performance in a medical facility.

Fourth Exemplary Embodiment

This exemplary embodiment shows a case of simultaneously using a plurality of work efficiency indices to set different goals depending on job positions and executing air-conditioning control. To be specific, this exemplary embodiment shows a case of setting different work efficiency indices for job types in a research unit. Even if the same work-related goal is set in a certain research unit, required works usually vary with job positions. For example, assuming a work-related goal of a research unit of a company is to lead to commercialization of their research in a case where study of technology has progressed to some degrees in the research unit, a work required of a manager or higher level of job type is to frequently have meetings with a business unit to appeal their research and technology, and a work required of a researcher who actually researches is to perform literature search for practical use of the technology. In this example, the work efficiency index for the manager or higher level of job type is the number of meetings with the business unit, and the work efficiency index for a researcher is the ratio of time when the researcher reads documents to the total working time. Thus, the work efficiency indices for the manager and the researcher are different. Temperature setting and illuminance setting for the manger's desk and the researcher's area are performed so as to encourage their behaviors for increasing the respective indices.

Figure 11:
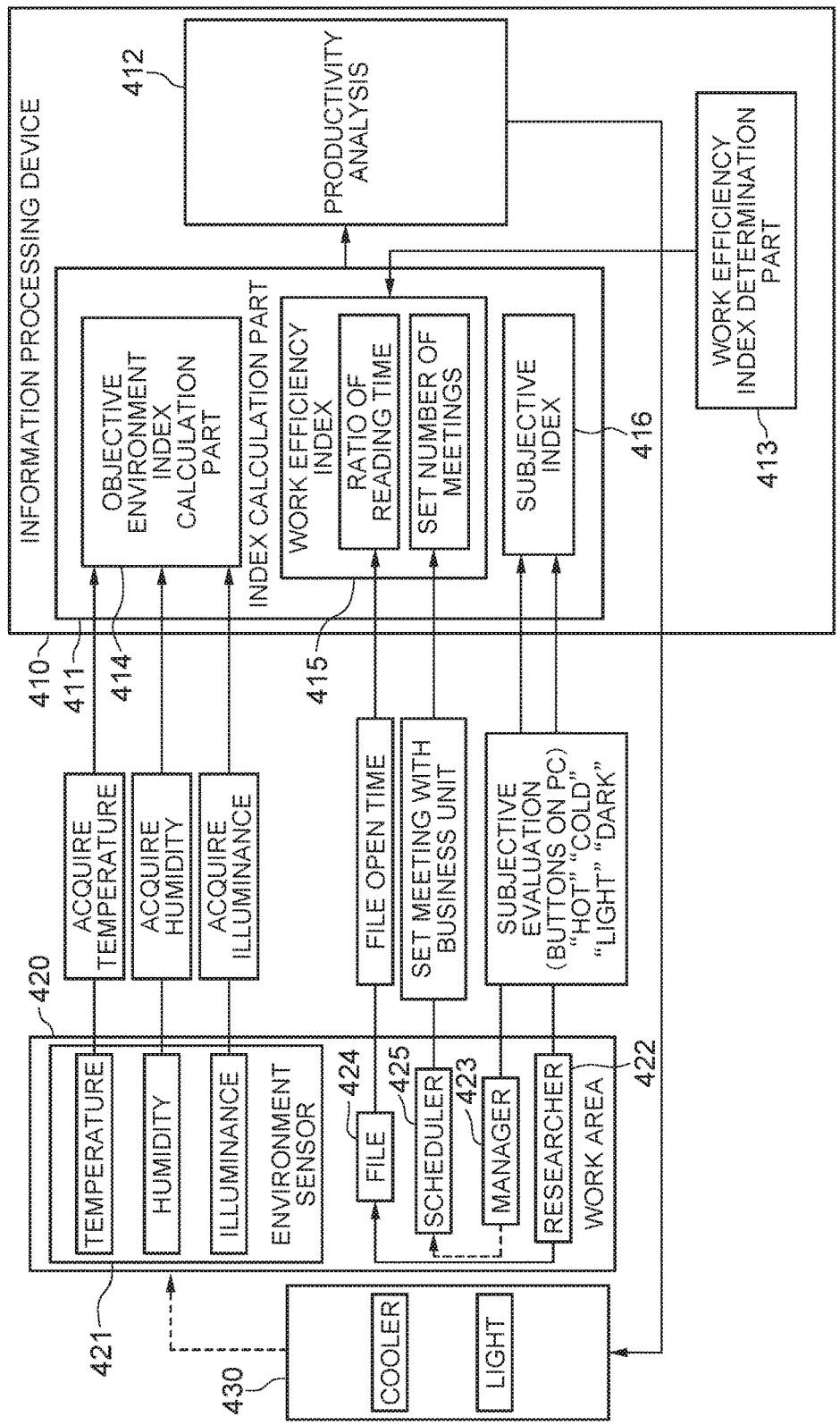
FIG. 11 is a block diagram of an environment control system according to a fourth exemplary embodiment of the present invention.

Referring to FIG. 11, an environment control system according to this exemplary embodiment has an information processing device 410, and a facility appliance 430 that regulates the environment of a work area 420. The work area 420 is divided into a work area for a manager and a work area for a researcher. In each work area 420, an environment sensor (temperature sensor, humidity sensor, illuminance sensor) 421 that detects temperature, humidity and illuminance is placed. Moreover, in the researcher's work area 420, a terminal 422 operated by the researcher and a file 424 that stores technological documents and the like are placed. Moreover, in the manager's work area 420, a terminal 423 operated by the manager and a scheduler 425 that manages the manager's schedule are placed.

The information processing device 410 is a device for calculating and outputting a productivity index and also controlling the facility appliance 430. The information processing device 410 has an index calculation part 411 for calculating an index value from objective data like monitoring data and user's subjective data, a productivity analysis part 412 that calculates and outputs productivity from an index and also controlling the facility appliance 430, and a work efficiency index determination part 413 that defines productivity on the basis of a work-related goal before operation. Moreover, the index calculation part 411 has an objective environment index calculation part 414 a work efficiency index calculation part 415, and a subjective index calculation part 416. These parts have the same functions as the index calculation part 211, the productivity analysis part 212, the work efficiency index determination part 213, the objective environment index calculation part 214, the work efficiency index calculation part 215, and the subjective index calculation part 216 of the second exemplary embodiment. Below, a description will be made focusing on a different point from the second exemplary embodiment.

In this exemplary embodiment, the work efficiency index determination part 413 sets different work efficiency indices for the manager's work area 420 and the researcher's work area 420. For the manager, the work efficiency index determination part 413 determines the number of meetings with the business unit as the work efficiency index, and notifies to the work efficiency index calculation part 415. The work efficiency index calculation part 415 calculates the work efficiency index in the following manner:

$$\text{Work Efficiency Index·One Manager} = 1-(3-n)3 \text{ if } 3>n \quad (3\text{-}1)$$

$$\text{Work Efficiency Index·One Manager} = 1 \text{ if } 3 \leq n \quad (3\text{-}2),$$

where a target value of the number of set meetings is 3, and the number of actually planned meetings is n, for example.

The number n of actually planned meetings is measured by a plug-in program installed in the manager's scheduler 425 and notified to the work efficiency index calculation part 415. For example, in a case where the number of planned meetings is two, the work efficiency index is measured by using Equation (3-1), whereby $1-\frac{1}{3}=\frac{2}{3}=0.6666$ is obtained.

On the other hand, the work efficiency index determination part 413 determines the length of time when the researcher reads documents on the research theme as the researcher's work efficiency, and notifies to the work efficiency index calculation part 415. For example, the work efficiency index calculation part 415 regards the length of time when the researcher opens technical documents as an examination time, acquires the length of the time, and calculates the ratio of the length of the time when the researcher reads documents to the total working time. For example, assuming the length of time when the researcher has opened the file 424 in the past three hours is one hour, the work efficiency index is calculated in the following manner:

$$\text{Work Efficiency Index·One Researcher} = \frac{1}{3} = 0.33333.$$

The work efficiency index is calculated for each area and weighted for each person in the area. For example, in a case where the work efficiency indices of two managers in the manager's work area 420 and the work efficiency indices of five researchers in the researcher's work area 420 are values as shown in FIG. 12, the work efficiency index for the manager's area and the work efficiency index for the researcher's area are calculated in the following manner:

$$\text{Work Efficiency Index·All Managers} = \frac{1}{2}*0.333 + \frac{1}{2}*1.0 = 0.666666$$

$$\text{Work Efficiency Index·All Researchers} = \frac{1}{5}*0.5 + \frac{1}{5}*0.2 + \frac{1}{5}*0.7 + \frac{1}{5}*0.9 + \frac{1}{5}*0.1 = 0.48$$

The objective environment index calculation part 414 acquires the illuminance of a light in addition to temperature and humidity, and calculates objective environment indices. Regarding an index for temperature, the index value is obtained by converting temperature into ET* and using Equations (1-1) to (1-3) as in the second exemplary embodiment. Regarding illumination, like temperature, the index value is obtained by calculating a deviation from a comfortable illuminance range in the following manner:

$$\text{Objective Environment Index/Illuminance} = 1-(L\min-L)/L \text{ if } L<L\min \text{ [lx]} \quad (3\text{-}2)$$

$$\text{Objective Environment Index/Illuminance} = 1 \text{ if } L\min \leq L<L\max \text{ [lx]} \quad (3\text{-}2)$$

$$\text{Objective Environment Index/Illuminance} = 1-(L-24.5)/L\max \text{ if } L\max<L \text{ [lx]}, \quad (3\text{-}2)$$

where comfortable illuminance is within a range $L\min<L<L\max$ [lx].

Herein, a process of controlling the color of light depending on a work-related goal may be added. In a manager area, where communication with others is important, the color of light is set to warm white so that people can easily gather or set to a color rendering index Ra, which is a color making it easy to see a face color. The color of light in an area for a researcher who needs learning is set to white while reducing warm color. Moreover, comfortable illuminance varies with the color of light, so that the criterion Lmin and the maximum value Lmax of the objective environment index may be changed for each area.

Thus, in the case of monitoring a plurality of values as objective indices, it is possible to integrate the objective environment indices as shown below:

$$\text{Objective Environment Index} = w\_lighting*(\text{objective environment index/illuminance}) + w\_temperature (\text{objective environment index/temperature}) \quad (3\text{-}5)$$

The subjective index calculation part 416 acquires an evaluation of lighting "light" or "dark" in addition to an evaluation of temperature "hot" or "cold" from each manager and each researcher as subjective evaluations. A calculation method may be the same as in the second exemplary embodiment, and one subjective evaluation value may be obtained as shown below:

$$\text{Subjective Environment Index} = wl*(\text{subjective environment index<illuminance>}) + wt(\text{subjective environment index<temperature>}) \quad (3\text{-}5).$$

The other configurations are the same as in the second exemplary embodiment.

Figure 13:
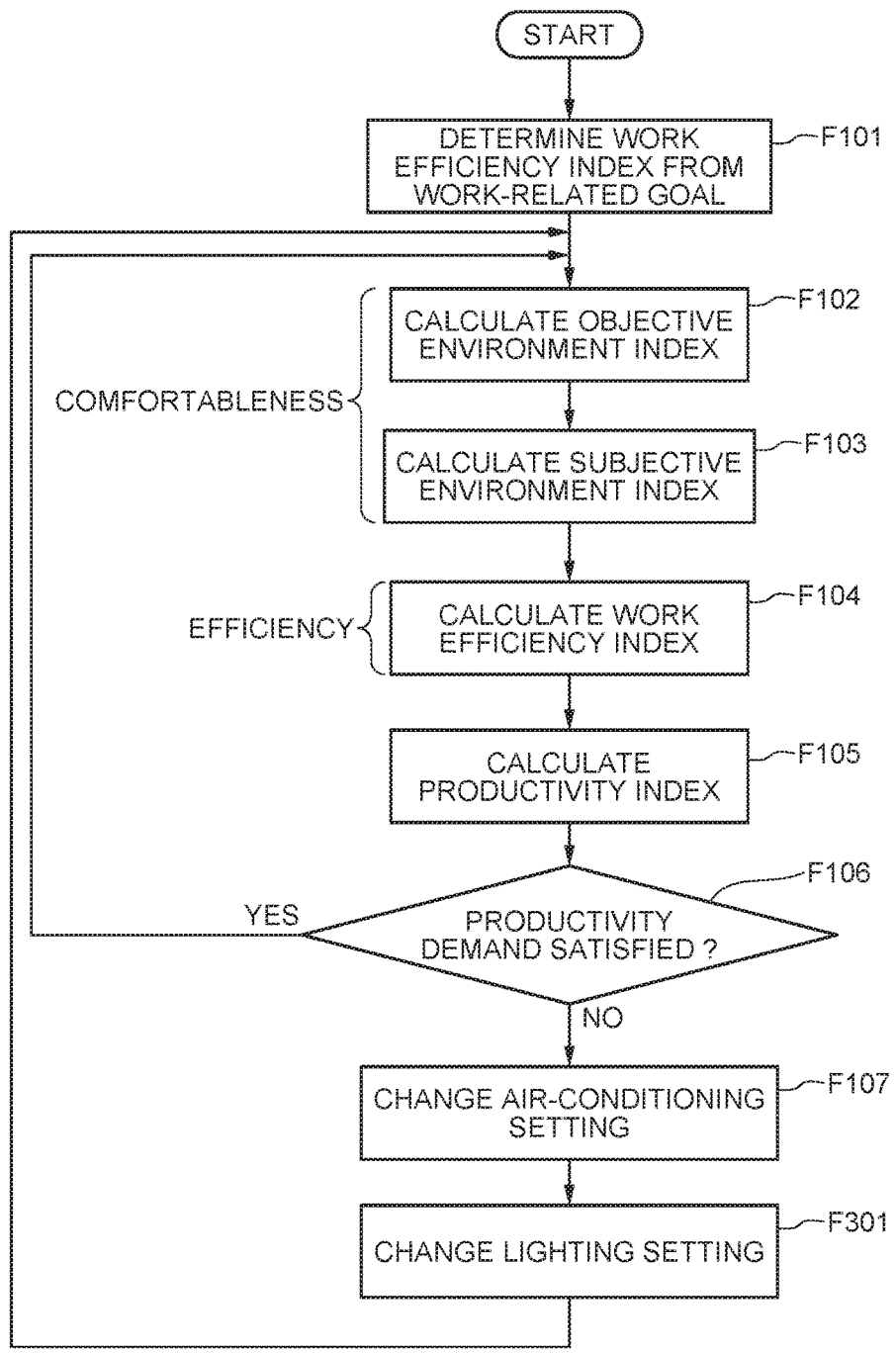
FIG. 13 is a flowchart showing an example of the operation of the environment control system according to the fourth exemplary embodiment of the present invention.

A temporal flow of the respective components in this exemplary embodiment will be described referring to a flowchart of FIG. 13. The procedure up to acquisition of the objective environment index, the subjective environment index and the work efficiency index is the same as in the second exemplary embodiment. Lighting control is performed in this exemplary embodiment. Therefore, in a case where it is determined to change the setting of the light control in order increase productivity at step F106, the setting of the light is changed (F301).

According to this exemplary embodiment, the work efficiency index is changed for each post to evaluate productivity. Consequently, it is possible to more accurately index work efficiency, and it is possible to control the environment so as to get closer to a work-related goal.

Further, in this exemplary embodiment, lighting control is performed in addition to air-conditioning control. Consequently, methods for creating an environment which increases worker's work efficiency and it gets closer to the work-related goal, namely, productivity increase.

Although a goal of productivity enhancement is set to achievement of a work in an office building in this exemplary embodiment, the goal is not limited to a work. For example, the goal may be set to achievement of any activity in a facility, such as learning and a club activity in an educational facility, the satisfaction level of visitors and sales in an event site, an amusement facility or an accommodation, sales at a shop or the like in a commercial facility, the happiness level of residents in an apartment, an activity at a community center or a library, and job performance in a medical facility.

Fifth Exemplary Embodiment

This exemplary embodiment is featured by previously determining the content of control of a facility appliance like an air conditioner in accordance with a work-related goal on the basis of a history of each index obtained in the past operation. To be specific, an influence of the setting of temperature on work efficiency and a productivity index is determined on the basis of the history, and the set temperature and the set air volume in control of the air conditioner are determined in advance.

Figure 14:
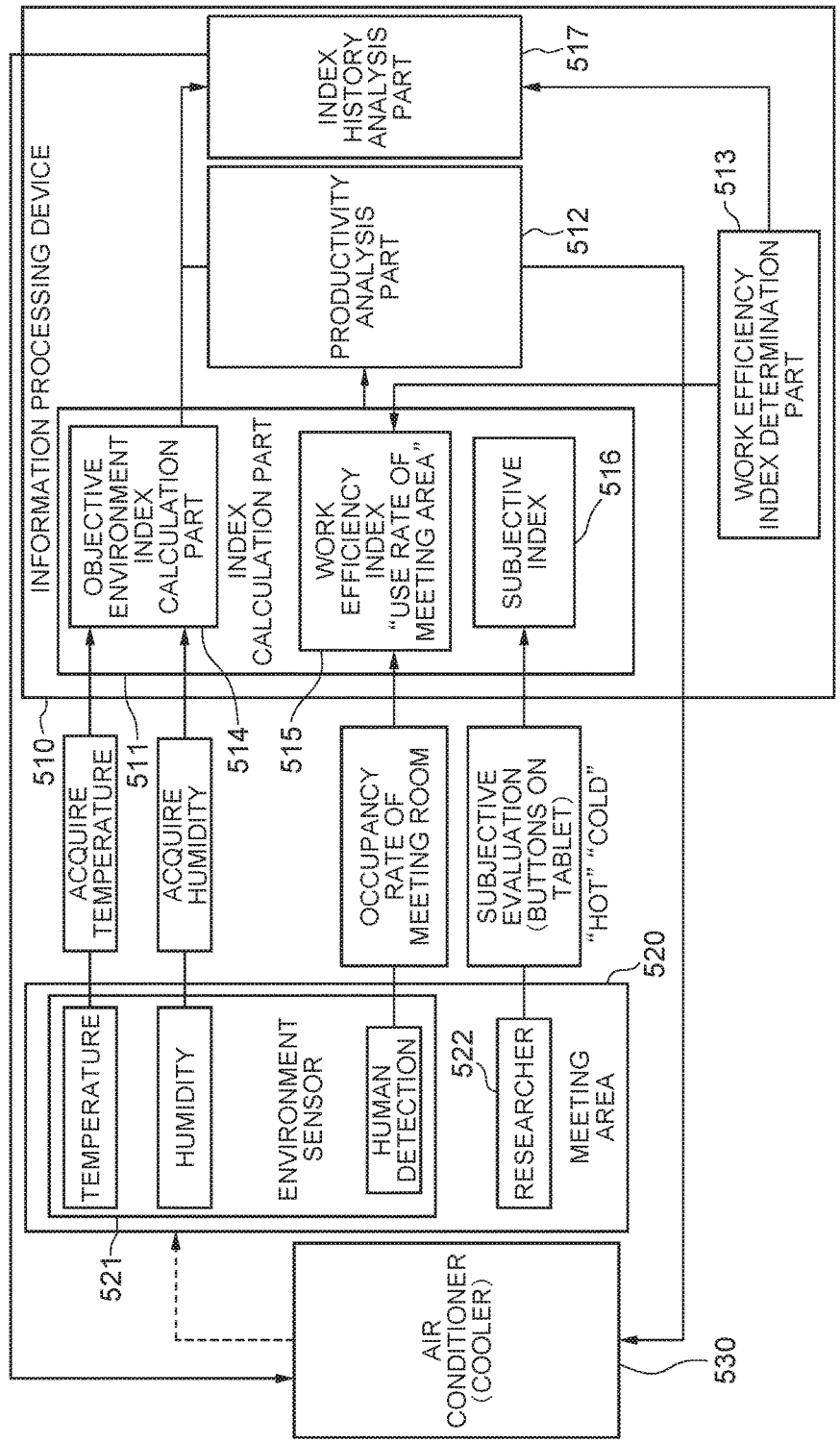
FIG. 14 is a block diagram of an environment control system according to a fifth exemplary embodiment of the present invention.

Referring to FIG. 14, an environment control system according to this exemplary embodiment has an information processing device 510, and an air conditioner 530 that cools a meeting area 520. In the meeting area 520, an environment sensor 521 that detects temperature, humidity and human bodies and a terminal 522 operated by a researcher are placed. The information processing device 510 has an index calculation part 511, a productivity analysis part 512, a work efficiency index determination part 513, and an index history analysis part 517. The components other than the index history analysis part 517 have the same functions as the components having the same names in the second exemplary embodiments.

As described above, this exemplary embodiment includes, in addition to the components in the second exemplary embodiment, the index history analysis part 517 in the information processing device 510. The index history analysis part 517 holds a table as shown in FIG. 15, in which time and date, outdoor temperature and weather when the value of the productivity index was 0.9 or more are listed. At the time of operation, the index history analysis part 517 searches the table shown in FIG. 15 for a history of a condition showing the closest season, weather, time, day of the week and outdoor temperature to those of the current operation, and performs setting of temperature and air volume of the air conditioner 530 on the basis of the setting of temperature and air volume of the air conditioner in the searched history. Herein, the closest history in environment condition (season, weather, time, day of the week and the like) is selected from the table. However, in a case where the amount of data becomes a huge amount, determination may be performed systematically by performing regression analysis.

Operation is performed after the temperature and air volume of the air conditioner are set referring to a history which increases productivity as mentioned above. The appropriate temperature setting may vary during operation with change of environment and condition and change of another factor (population density, the content of a work) that affects the perceived temperature. In such a case, by performing the same operation as in the second to fourth exemplary embodiments, minor tuning will be performed.

Thus, in this exemplary embodiment, by acquiring the setting of the facility appliance (air conditioner, light and the like) that can keep the productivity index high from the history, the setting of the facility appliance is prevented from largely departing from the comfortableness for office users. Moreover, it is possible to previously know the environment setting that can keep the index high from the history.

Although a goal of productivity enhancement is set to achievement of a work in an office building in this exemplary embodiment, the goal is not limited to a work. For example, the goal may be set to achievement of any activity in a facility, such as learning and a club activity in an educational facility, the satisfaction level of visitors and sales in an event site, an amusement facility or an accommodation, sales at a shop or the like in a commercial facility, the happiness level of residents in an apartment, an activity at a community center or a library, and job performance in a medical facility.

Sixth Exemplary Embodiment

This exemplary embodiment is featured by performing air-conditioning control in consideration of a tradeoff between productivity and power saving for the purpose of restriction of energy consumption in addition to increase of productivity.

Figure 16:
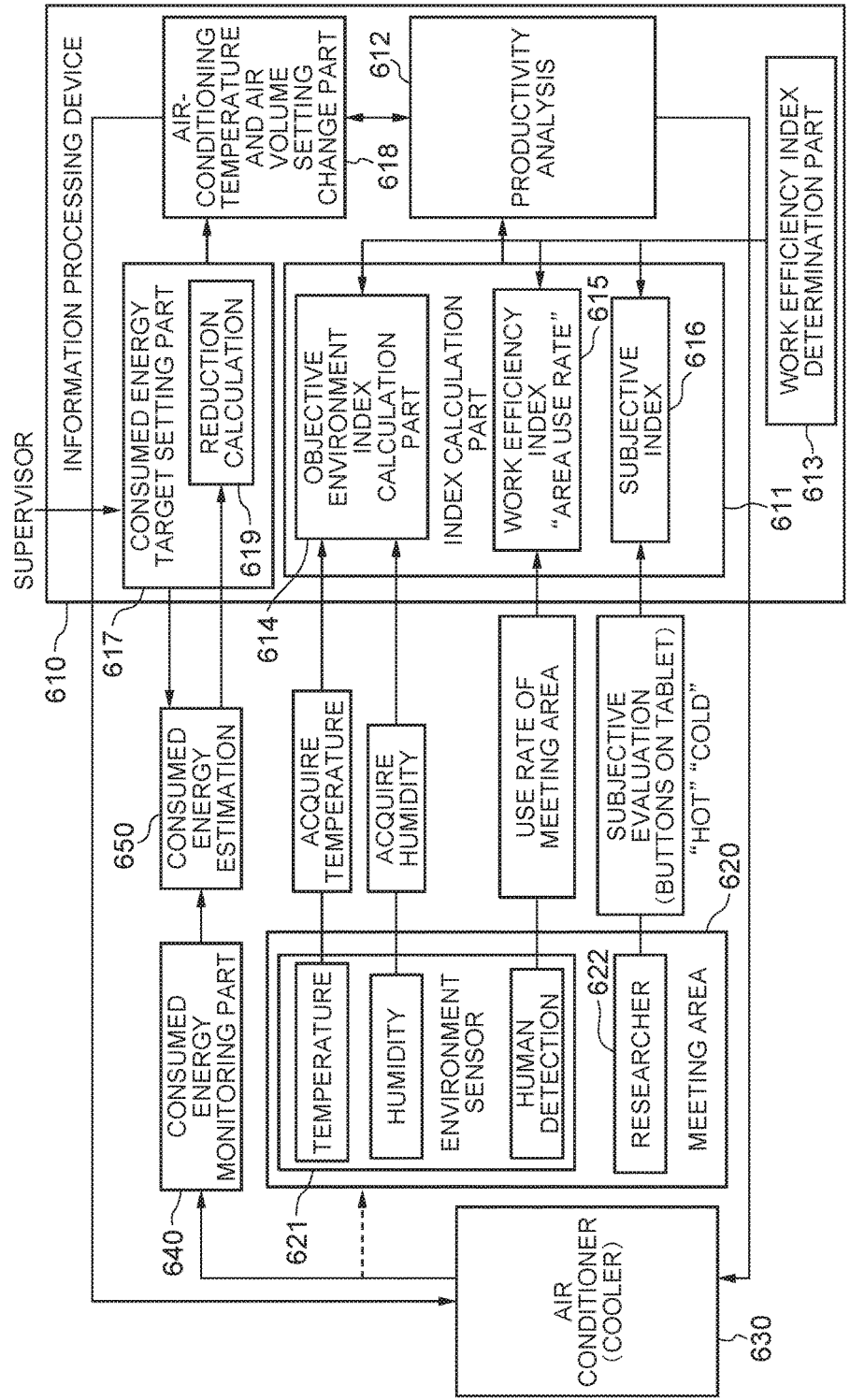
FIG. 16 is a block diagram of an environment control system according to a sixth exemplary embodiment of the present invention.

Referring to FIG. 16, an environment control system according to this exemplary embodiment has an information processing device 610, an air conditioner 630 that cools a meeting area 620, a consumed energy monitoring part 640, and a consumed energy estimation part 650. In the meeting area 620, an environment sensor 621 that detects temperature, humidity and human body and a terminal 622 operated by a researcher are placed. The information processing device 610 has an index calculation part 611, a productivity analysis part 612, a work efficiency index determination part 613, a consumed energy target setting part 617, and an air-conditioning temperature and air volume setting change part 618. The index calculation part 611 has an objective environment index calculation part 614, a work efficiency index calculation part 615, and a subjective index calculation part 616. Among them, the components other than the consumed energy monitoring part 640, the consumed energy estimation part 650, the consumed energy target setting part 617, and the air-conditioning temperature and air volume setting change part 618 have the same function as the components having the same names in the second exemplary embodiment. In this exemplary embodiment, there are a plurality of meeting areas 620. Moreover, the air conditioner 630 operates in the heater mode.

In this exemplary embodiment, the information processing device 610 has the consumed energy target setting part 617, and the supervisor sets a target value of consumed energy from the viewpoint of environment and power saving. The consumed energy target value may be set by a building supervisor on the basis of a power saving object, or may be determined by demand response. Moreover, the consumed energy target setting part 617 has a reduction calculation part 619. In a case where it is estimated that the consumed energy exceeds the set target on the basis of a consumed energy estimation value of the near future notified by the consumed energy estimation part 650, the reduction calculation part 619 calculates a necessary reduction for preventing the consumed energy from exceeding the set target, and transmits a reduction request to the air-conditioning temperature and air volume setting change part 618. The consumed energy estimation part 650 calculates the consumed energy on the basis of the result of monitoring the consumed energy notified by the monitoring part 640 that monitors the consumed energy. Upon receiving the reduction request, the air-conditioning temperature and air volume setting change part 618 determines an area to change air-conditioning setting.

Figure 17:
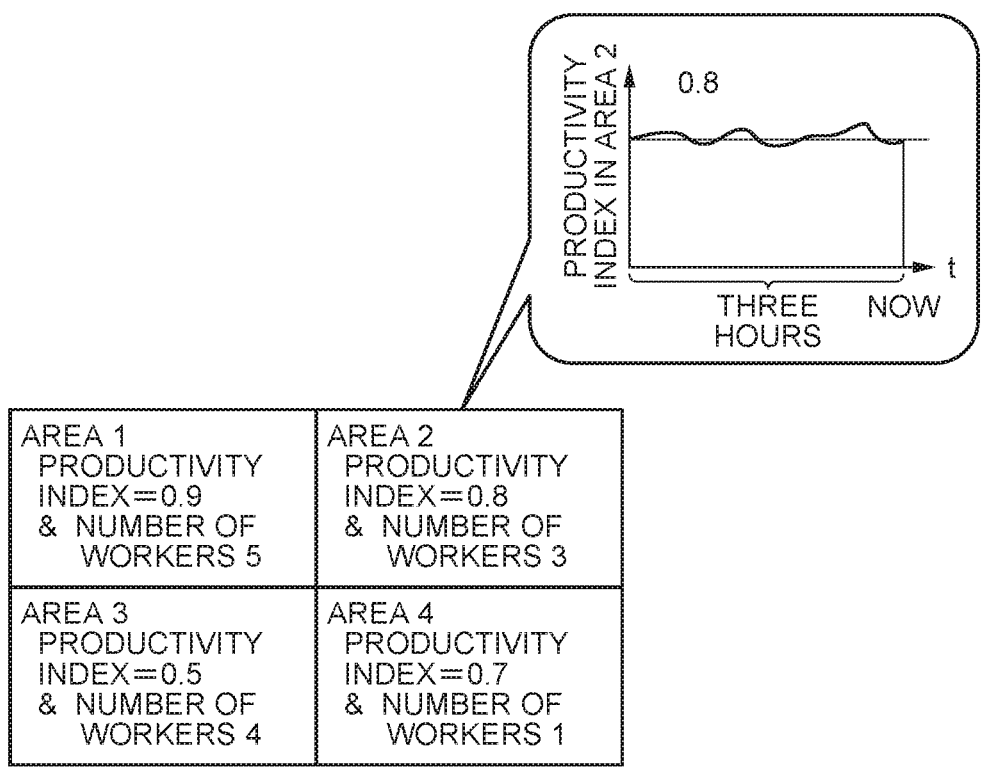
FIG. 17 is a diagram showing an example of the status of a meeting floor, which is the target of control by the environment control system according to the sixth exemplary embodiment of the present invention.

FIG. 17 shows the status of a meeting floor in winter. In each area, a productivity index for workers in the area is calculated in the same manner as in the second exemplary embodiment, and air-conditioning control is performed. The number of workers in each area is acquired by the human detection sensor.

Figure 18:
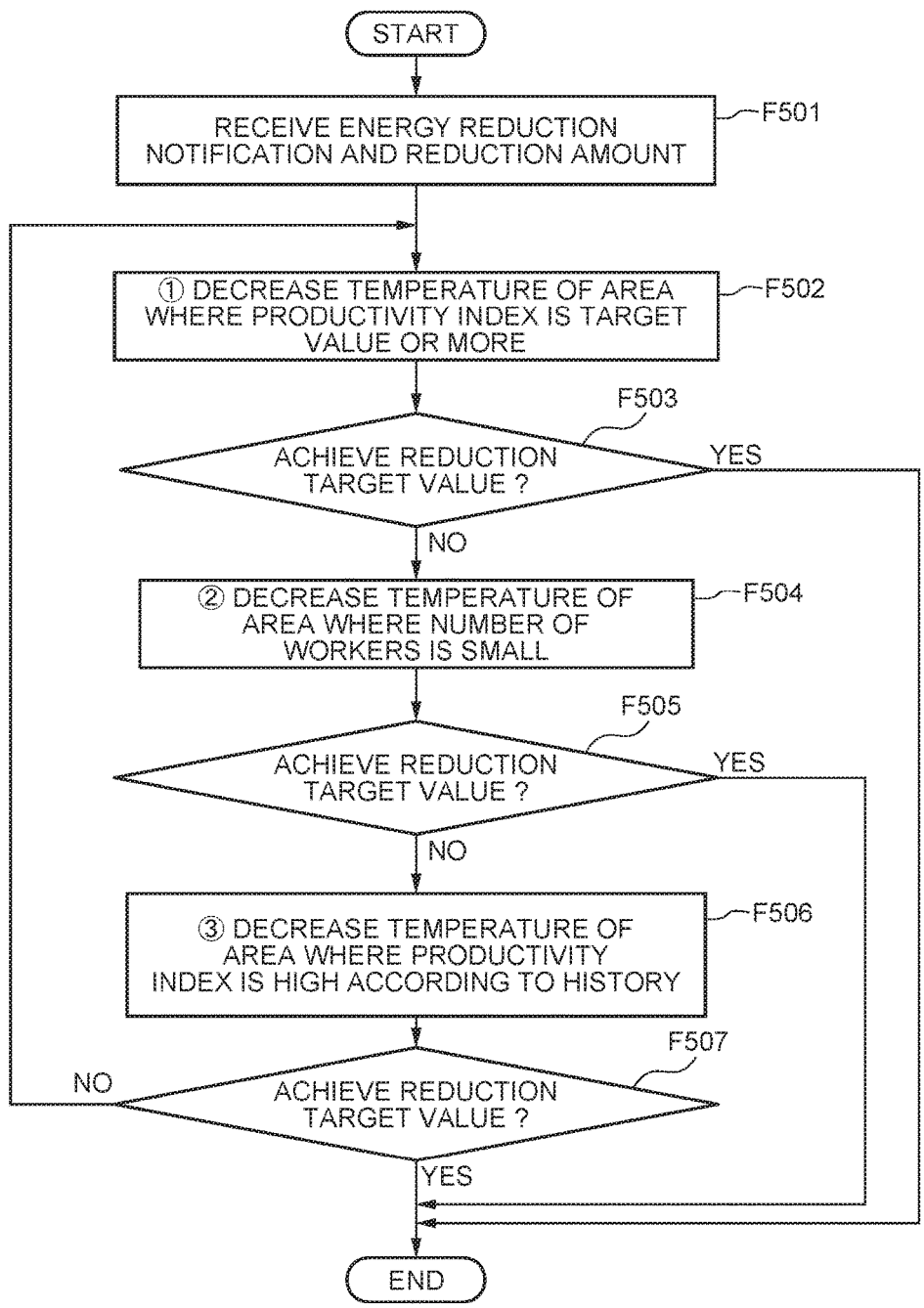
FIG. 18 is a flowchart showing an example of the operation of the environment control system according to the sixth exemplary embodiment of the present invention.

FIG. 18 is a flowchart showing, of the operation in this exemplary embodiment, operation after the air-conditioning temperature and air volume setting change part 618 receives a consumed energy reduction request. The air-conditioning temperature and air volume setting change part 618 receives a consumed energy reduction notification and an amount to be reduced from the reduction calculation part 619. Decrease of the set temperature of the heater enables reduction of consumed energy. An area in which the set temperature is to be increased is determined in a procedure shown in the flowchart of FIG. 18. After receiving the consumed energy reduction request (F501), the air-conditioning temperature and air volume setting change part 618 determines a reduction area on the basis of three criteria. First, the air-conditioning temperature and air volume setting change part 618 decreases the set temperature of an area where the productivity index is higher than the target value (F502). Herein, the productivity index in the area 1 is 0.9, so that the set temperature is decreased by 0.5° C., for example. The degree to be decreased may be determined depending on the difference between the productivity index and the threshold. Next, the air-conditioning temperature and air volume setting change part 618 examines whether or not the target reduced reduction amount of consumed energy is achieved by decreasing the temperature by 0.5° C. (F503). It may be examined by actually decreasing the temperature and monitoring to acquire the reduction amount, or it may be calculated whether to reach the consumed energy reduction target value from the temperature decrease amount by calculation. Then, in a case where it does not reach the target, the air-conditioning temperature and air volume setting change part 618 checks the number of workers and decreases the set temperature in an area where the number of workers is the least (F504). Because the number of workers in the area 4 is one, the temperature in the area 4 is decreased by 0.5° C. The air-conditioning temperature and air volume setting change part 618 also acquires whether or not the target reduced energy value is achieved (F505). In a case where the target is not achieved, as the third criterion, the air-conditioning temperature and air volume setting change part 618 decreases the set temperature by 0.5° C. in an area where the productivity index is the highest according to the history (F506). For example, assuming the productivity index has not changed much and has been kept as high as approximately 0.8 for three hours as shown in the area 2 of FIG. 17, the air-conditioning temperature and air volume setting change part 618 decreases the set temperature in the area 2 by 0.5° C. In a case where the target is still not achieved (F507), the air-conditioning temperature and air volume setting change part 618 decreases the set temperature on the basis of the three criteria again. The order of the criteria may be changed.

According to this exemplary embodiment, even if energy reduction is requested when productivity index values vary with areas, it is possible to reduce energy while keeping decrease of comfortableness in an area with a low productivity index as little as possible.

Although a goal of productivity enhancement is set to achievement of a work in an office building in this exemplary embodiment, the goal is not limited to a work. For example, the goal may be set to achievement of any activity in a facility, such as learning and a club activity in an educational facility, the satisfaction level of visitors and sales in an event site, an amusement facility or an accommodation, sales at a shop or the like in a commercial facility, the happiness level of residents in an apartment, an activity at a community center or a library, and job performance in a medical facility.

Seventh Exemplary Embodiment

This exemplary embodiment is featured by regularly verifying the validity of a work efficiency index on the basis of a correlation coefficient between a work-related goal and work efficiency and, in a case where correlation is poor, changing the work efficiency index. That is, because a work efficiency index determined at the start of operation is not always valid, a correlation coefficient between a productivity index and the level of achievement of a work-related goal is calculated after operation of the work efficiency index for a given period and, in a case where the coefficient is small, the work efficiency index is changed.

Figure 19:
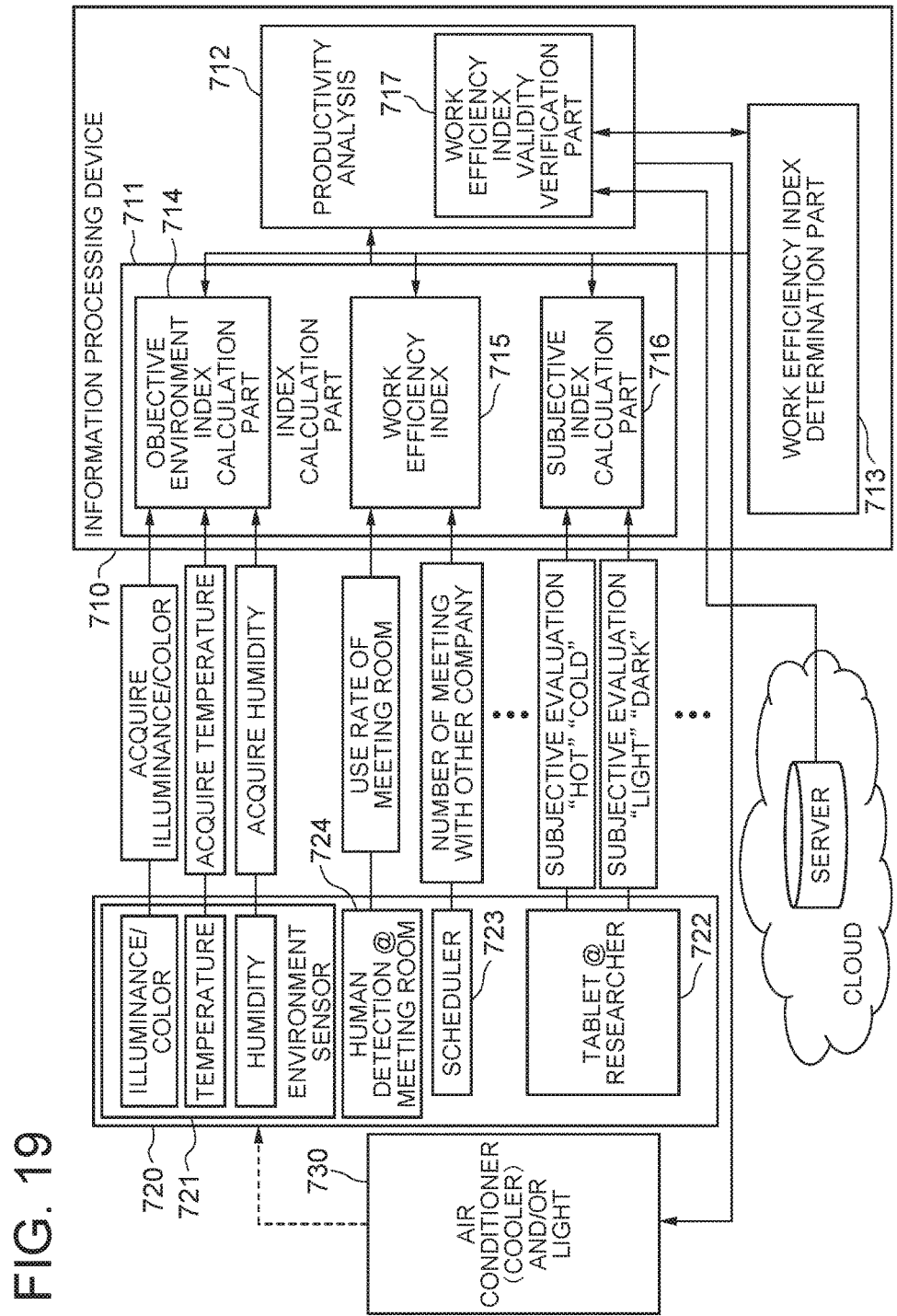
FIG. 19 is a block diagram of an environment control system according to a seventh exemplary embodiment of the present invention.

Referring to FIG. 19, an environment control system according to this exemplary embodiment has an information processing device 710 and a facility appliance 730 that regulates the environment of an area 720. In the area 720, an environment sensor 721 detecting temperature, humidity and illuminance/color, a terminal 722 operated by a researcher, a scheduler 723 managing the schedule of the researcher, and a human detection sensor 724 detecting a human body in a meeting room are placed. The information processing device 710 has an index calculation part 711, a productivity analysis part 712, and a work efficiency index determination part 713. The index calculation part 711 has an objective environment index calculation part 714, a work efficiency index calculation part 715, and a subjective index calculation part 716. The productivity analysis part 712 has a work efficiency index validity verification part 717. Among them, the components other than the work efficiency index validity verification part 717, the facility appliance 730, the scheduler 723 and the human detection sensor 724 have the same functions as the components having the same names in the second exemplary embodiment. Moreover, the scheduler 723 has basically the same function as the scheduler 425 shown in FIG. 11, the human detection sensor 724 has basically the same function as the human detection sensor shown in FIG. 6, and the facility appliance 730 has basically the same function as the facility appliance 430 shown in FIG. 11. As the area 620, a plurality of areas including a researcher's work area and a meeting room are prepared.

FIG. 20A shows an example of a table in which some candidates for work efficiency indices corresponding to a work-related goal are set with priorities. This table is held by the work efficiency index determination part 713, for example. Referring to FIG. 20A, the table shows a list of work efficiency indices for each work-related goal in a certain research unit. Moreover, the table shows, for each work efficiency index, an environment index which supports increase of the work efficiency index, a correlation coefficient between the achievement level of the work-related goal and a productivity index which is calculated from the past operation, and the priority. The priorities are set in decreasing order of the past correlation coefficients. In actual operation, the work efficiency index determination part 713 selects a work efficiency index with the highest priority. For example, in a case where the work-related goal is a proposal for new research, the work efficiency index determination part 713 determines the use rate of a meeting room with a priority level 1 as the work efficiency index, and notifies to the work efficiency index calculation part 715 and the work efficiency index validity verification part 717.

When receiving a notification of the work efficiency index corresponding to the proposal for new research as the work-related goal, the work efficiency index validity verification part 717 first quantifies the work-related goal. In this case, it is the registration number of reports on proposals. FIG. 20B shows the result of acquisition of the number of reports and the use rate of the meeting area for five terms. The unit of a term is one week. For example, when acquiring the number of reports and the use rate of the meeting area for five weeks, the work efficiency index validity verification part 717 calculates a correlation coefficient between the two values. Referring to FIG. 20B, the result is approximately 0.98. This result is set as the correlation coefficient for the use rate of the meeting area in the case of new research proposal on the table shown in FIG. 20A. Also, for the ratio of time for keyboard typing, the number of meetings with another company and the like, correlation coefficients are acquired from the past operation and put on the table. Then, the priorities are set in decreasing order of the correlation coefficients. The order of priority is determined on the basis of the correlation coefficient, but may be determined by another method. For example, the order of priority may be determined on the basis of the career, job history and specialty of each member of the research group.

Figure 21:
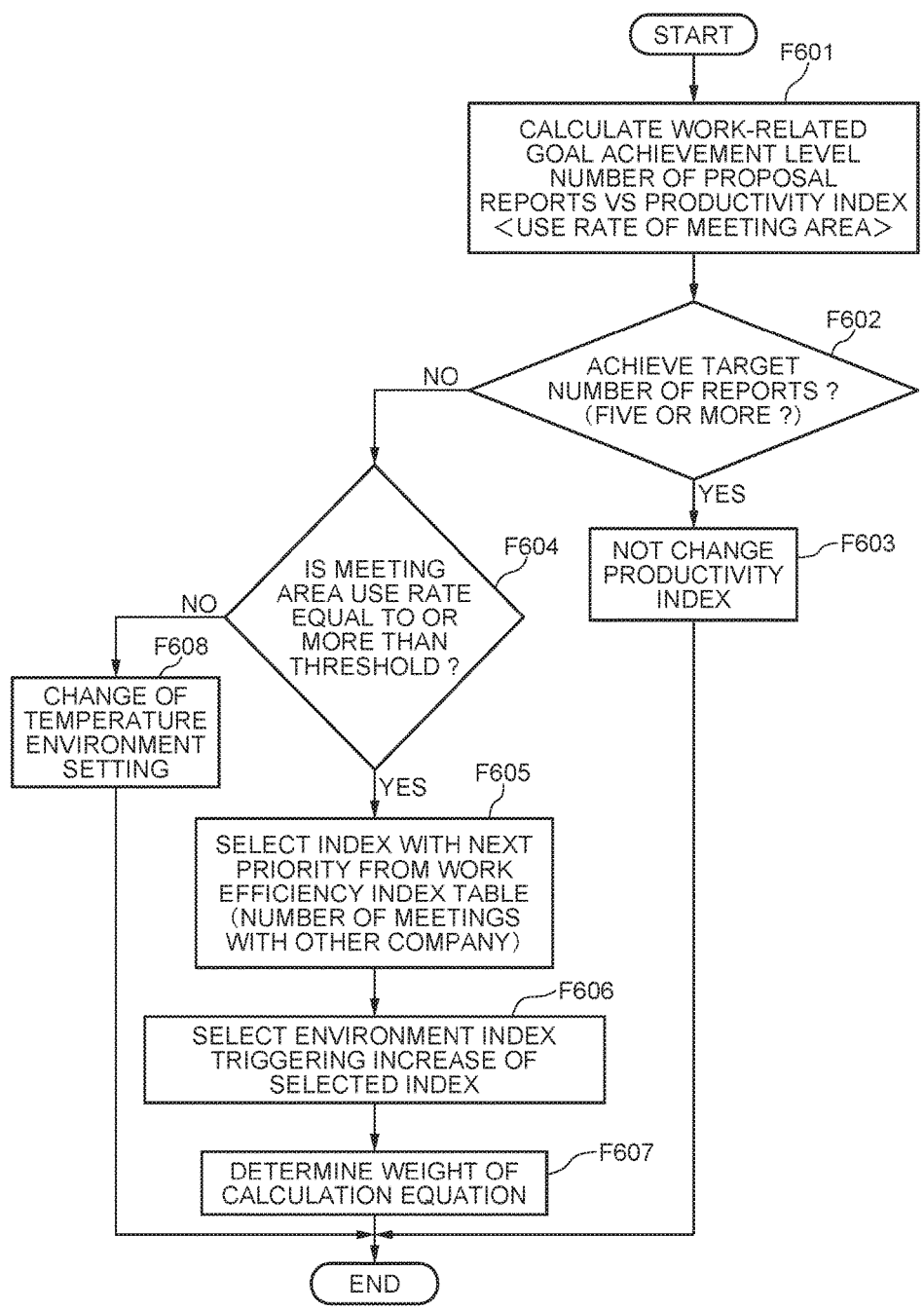
FIG. 21 is a flowchart showing an example of the operation of the environment control system according to the seventh exemplary embodiment of the present invention.

FIG. 21 is a flowchart showing a procedure for changing a productivity index. First, the work efficiency index validity verification part 717 examines the achievement level of the work-related goal after operation for a given period (F601, F602). In a case where the work-related goal has been achieved, the work efficiency index validity verification part 717 does not change the productivity index (F603). On the other hand, in a case where the work-related goal has not been achieved, the work efficiency index validity verification part 717 determines whether the cause is the environment or the work efficiency index in the following manner. For example, assuming the number of reports on proposals is three and the target number is five, the work efficiency index validity verification part 717 determines that the work-related goal has not been achieved.

First, the work efficiency index validity verification part 717 examines whether or not the use rate of the meeting area is equal to or more than a threshold (F604). In a case where the use rate of the meeting area is less than the threshold, the work efficiency index validity verification part 717 proceeds to step F608 to change temperature environment setting. On the other hand, for example, assuming the use rate of the meeting area is 0.98 and the target is 0.9, the work efficiency index validity verification part 717 determines that having a meeting does not contribute to a new proposal because a report cannot be written in spite of high efficiency. In other words, the work efficiency index validity verification part 717 determines that another work item is important. Then, the work efficiency index validity verification part 717 refers to the table, and sets the number of meetings with another company with the second priority, as the index (F605). Subsequently, in order to set an environment for triggering increase of the number of meetings with another company, the work efficiency index validity verification part 717 determines temperature and illuminance as environment indices on the basis of the table shown in FIG. 20A (F606). At this moment, the work efficiency index validity verification part 717 may acquire the weights of temperature and light appropriate for increase of the number of meetings from a cloud server or the like and set the value (F606). Then, the work efficiency index validity verification part 717 restarts operation on the basis of the value. Operation after that is the same as in the fourth exemplary embodiment, and the settings of air conditioning and lighting are regulated in accordance with ambient air and hour on the basis of researcher's subjective evaluation and objective evaluation.

As a method of setting an operation period, a plurality of options can be considered. A given time such as one week and one month may be set, or an operation period may be until a time when the productivity index as shown by Equation (1-6) becomes equal to or more than a threshold.

According to this exemplary embodiment, it is possible to dynamically change a work efficiency index to a proper one, so that achievement of a work-related goal is more facilitated.

Although a goal of productivity enhancement is set to achievement of a work in an office building in this exemplary embodiment, the goal is not limited to a work. For example, the goal may be set to achievement of any activity in a facility, such as learning and a club activity in an educational facility, the satisfaction level of visitors and sales in an event site, an amusement facility or an accommodation, sales at a shop or the like in a commercial facility, the happiness level of residents in an apartment, an activity at a community center or a library, and job performance in a medical facility.

The present invention is based upon and claims the benefit of priority from Japanese patent application No. 2014-081602, filed on Apr. 11, 2014, the disclosure of which is incorporated herein in its entirety by reference.

INDUSTRIAL APPLICABILITY

The present invention can be generally applied to fields of controlling the environment of facilities like a building.

The whole or part of the exemplary embodiments disclosed above can be described as, but not limited to, the following supplementary notes.

(Supplementary Note 1)

A productivity evaluation system comprising:

an information processing device into which activity efficiency evaluation information, objective environment evaluation information and subjective environment evaluation information are input, the activity efficiency evaluation information being determined on a basis of a goal to achieve and an activity content of a user in an area, the objective environment evaluation information being of an environment influencing activity efficiency, the subjective environment evaluation information being based on a notification from the user, wherein on a basis of the environment information and the activity efficiency evaluation information input into the information processing device, an index for evaluating productivity (namely, a productivity index) is obtained.

(Supplementary Note 2)

The productivity evaluation system according to supplementary note 1, wherein an achievement level of the goal of the user in the area is compared with the activity efficiency evaluation information determined on the basis of the activity content, the objective and subjective environment evaluation information and a productivity index as a function of the three input information, and the three input information are changed according to a certain criterion.

(Supplementary Note 3)

The productivity evaluation system according to supplementary note 1 or 2, wherein in a case where the area is divided into two or more areas or in a case where there are different work contents in a single area, it is determined to input different activity efficiency evaluation information and different objective and subjective environment evaluation information for the respective areas or work contents.

(Supplementary Note 4)

The productivity evaluation system according to any of supplementary notes 1 to 3, wherein on a basis of a history of change with time of the activity efficiency evaluation information, the objective and subjective environment evaluation information and a productivity index calculated from the three evaluation information in the area, a condition of setting of power equipment is changed.

(Supplementary Note 5)

The productivity evaluation system according to any of supplementary notes 1 to 4, wherein when a consumed energy in the area exceeds a threshold, referring to values of the activity efficiency evaluation information, the objective and subjective environment evaluation information and a productivity index calculated from the three evaluation information in the area, setting of power equipment is changed so as to prevent decrease of the evaluation values and the index value.

(Supplementary Note 6)

The productivity evaluation system according to any of supplementary notes 1 to 5, wherein when a total consumed energy in two or more areas exceeds a threshold, referring to values of the activity efficiency evaluation information, the objective and subjective environment evaluation information and a productivity index calculated from the three evaluation information in each of the areas, an area where a consumed energy is reduced is determined on a basis of present values of the evaluation values and the index value, a history of the evaluation values and the index value, a number of people, and the like.

(Supplementary Note 7)

The productivity evaluation system according to any of supplementary notes 1 to 6, wherein the subjective environment evaluation information based on the notification from the user in the area is based on a notification of evaluation of the objective environment evaluation information by any or combination of five senses of the user.

(Supplementary Note 8)

The productivity evaluation system according to any of supplementary notes 1 to 7, wherein work efficiency information set in accordance with a work-related goal and a work content of the user in the area is input information obtained by counting a number of participants in a meeting area.

(Supplementary Note 9)

The productivity evaluation system according to any of supplementary notes 1 to 8, wherein the objective environment evaluation information in the area is input information of any or combination of temperature, humidity, airflow, thermal radiation, clothing insulation, heat load, metabolic rate, illuminance, sound level, music and scent.

(Supplementary Note 10)

The productivity evaluation system according to any of supplementary notes 1 to 9, wherein work efficiency information appropriate for the work content of the user in the area is input information obtained by measuring a use rate of a meeting area.

(Supplementary Note 11)

The productivity evaluation system according to supplementary note 9, wherein user's objective environment evaluation is evaluation of how hot or cold temperature is, how high or low humidity is, how light or dark illuminance is, and how high or low sound level is.

(Supplementary Note 12)

The productivity evaluation system according to any of supplementary notes 1 to 11, wherein productivity evaluation based on the objective environment evaluation information, the subjective environment evaluation information and work efficiency information is used as a control parameter of power equipment like an air conditioner.

(Supplementary Note 13)

An environment control system comprising:

a facility appliance regulating an environment of an area (equivalent to the air conditioners 230, 330, 430, 530, 630 and 730);

an activity measuring instrument for each activity kind, the activity measuring instrument measuring a status of an activity of a person in the area (equivalent to the human detection sensor and the like); and a control device connected to the facility appliance and the activity measuring instrument (equivalent to the information processing devices 210, 310, 410, 510, 610 and 710), wherein the control device includes:

an activity kind determination part determining an activity kind corresponding to a work performed in the area (equivalent to the work efficiency index determination part 213, 313, 413, 513, 613 and 713);

an objective environment index calculation part acquiring a status of an environment of the area and calculating a first index value corresponding to the acquired status (equivalent to the objective environment index calculation parts 214, 314, 414, 514, 614 and 714);

a subjective index calculation part acquiring an evaluation of the environment of the area by the person in the area and calculating a second index value corresponding the acquired evaluation (equivalent to the subjective index calculation parts 216, 316, 416, 516, 616 and 716);

an activity information acquisition part using the activity measuring instrument corresponding to the determined activity kind to acquire the status of the activity of the person in the area, and calculating a third index value corresponding to the acquired status of the activity of the person (equivalent to the work efficiency index calculation parts 215, 315, 415, 515, 615 and 715); and an environment control part calculating a fourth index value from the first to third index values and first to third weights assigned to the index values and causing the facility appliance to control the environment of the area on a basis of the fourth index value (equivalent to the productivity analysis parts 212, 312, 412, 512, 612 and 712).

(Supplementary Note 13)

An environment control system comprising:

a facility appliance regulating an environment of an area;

an activity measuring instrument for each activity kind, the activity measuring instrument measuring a status of an activity of a person in the area; and a control device connected to the facility appliance and the activity measuring instrument, wherein the control device includes:

an activity kind determination part determining an activity kind corresponding to a work performed in the area;

an activity information acquisition part using the activity measuring instrument corresponding to the determined activity kind to acquire the status of the activity of the person in the area; and an environment control part causing the facility appliance to control the environment of the area on a basis of the acquired status of the activity.

(Supplementary Note 14)

The environment control system according to supplementary note 13, wherein the activity kind determination part has a table holding an association relation between a work-related goal and the activity kind, and the activity kind determination part determines the activity kind held in the table in association with the work-related goal of the work performed in the area, as the activity kind corresponding to the work performed in the area, the work-related goal being input from outside.

(Supplementary Note 15)

The environment control system according to supplementary note 14, wherein the table holds for a single work-related goal a plurality of activity kinds with priorities, and the activity kind determination part determines the activity kind with a highest priority of the activity kinds held in the table in association with the work-related goal of the work performed in the area, as the activity kind corresponding to the work performed in the area.

(Supplementary Note 16)

The environment control system according to supplementary note 15, wherein the table holds for each of the activity kinds a correlation coefficient between the activity kind and a work-related goal achievement level, and the priorities are set in accordance with values of correlation coefficients.

(Supplementary Note 17)

The environment control system according to supplementary note 16, further comprising a verification part calculating the correlation coefficient every given period and updating the table.

(Supplementary Note 18)

The environment control system according to supplementary note 13, wherein the activity kind determination part refers to a table to determine the activity kind corresponding to the work performed in the area, the table holding an association relation between identification information of the area and the activity kind corresponding to the work performed in the area.

(Supplementary Note 19)

The environment control system according to any of supplementary notes 13 to 18, wherein:

the control device includes:

an objective environment index calculation part acquiring the status of the environment of the area and calculating a first index value corresponding to the acquired status; and a subjective index calculation part acquiring an evaluation of the environment of the area by the person in the area and calculating a second index value corresponding to the acquired evaluation;

the activity information acquisition part calculates a third index value corresponding to the status of the activity; and the environment control part calculates a fourth index value from the first to third index values and first to third weights assigned to the index values, and causes the facility appliance to control the environment of the area on a basis of the fourth index value.

(Supplementary Note 20)

A control device connected to a facility appliance regulating an environment of an area and an activity measuring instrument for each activity kind, the activity measuring instrument measuring a status of an activity of a person in the area, the control device comprising:

an activity kind determination part determining an activity kind corresponding to a work performed in the area;

an activity information acquisition part using the activity measuring instrument corresponding to the determined activity kind to acquire the status of the activity of the person in the area; and an environment control part causing the facility appliance to control the environment of the area on a basis of the acquired status of the activity.

(Supplementary Note 21)

An environment control method executed by a control device connected to a facility appliance regulating an environment of an area and to an activity measuring instrument for each activity kind, the activity measuring instrument measuring a status of an activity of a person in the area, the environment control method comprising:

determining an activity kind corresponding to a work performed in the area;

using the activity measuring instrument corresponding to the determined activity kind to acquire the status of the activity of the person in the area; and causing the facility appliance to control the environment of the area on a basis of the acquired status of the activity.

(Supplementary Note 22)

A computer program comprising instructions for causing a computer connected to a facility appliance regulating an environment of an area and to an activity measuring instrument for each activity kind measuring a status of an activity of a person in the area, to function as:

an activity kind determination part determining an activity kind corresponding to a work performed in the area;

an activity information acquisition part using the activity measuring instrument corresponding to the determined activity kind to acquire the status of the activity of the person in the area; and an environment control part causing the facility appliance to control the environment of the area on a basis of the acquired status of the activity.

(Supplementary Note 23)

The control device according to supplementary note 20, wherein the activity kind determination part has a table holding an association relation between a work-related goal and the activity kind, and the activity kind determination part determines the activity kind held in the table in association with the work-related goal of the work performed in the area, as the activity kind corresponding to the work performed in the area, the work-related goal being input from outside.

(Supplementary Note 24)

The control device according to supplementary note 23, wherein the table holds for a single work-related goal a plurality of activity kinds with priorities, and the activity kind determination part determines the activity kind with a highest priority of the activity kinds held in the table in association with the work-related goal of the work performed in the area, as the activity kind corresponding to the work performed in the area.

(Supplementary Note 25)

The control device according to supplementary note 24, wherein the table holds for each of the activity kinds a correlation coefficient between the activity kind and a work-related goal achievement level, and the priorities are set in accordance with values of correlation coefficients.

(Supplementary Note 26)

The control device according to supplementary note 25, further comprising a verification part calculating the correlation coefficient every given period and updating the table.

(Supplementary Note 27)

The control device according to supplementary note 20, wherein the activity kind determination part refers to a table to determine the activity kind corresponding to the work performed in the area, the table holding an association relation between identification information of the area and the activity kind corresponding to the work performed in the area.

(Supplementary Note 28)

The control device according to any of supplementary notes 20 and 23 to 27, further comprising:

an objective environment index calculation part acquiring the status of the environment of the area and calculating a first index value corresponding to the acquired status; and a subjective index calculation part acquiring an evaluation of the environment of the area by the person in the area and calculating a second index value corresponding to the acquired evaluation, wherein:

the activity information acquisition part calculates a third index value corresponding to the status of the activity; and the environment control part calculates a fourth index value from the first to third index values and first to third weights assigned to the index values, and causes the facility appliance to control the environment of the area on a basis of the fourth index value.

(Supplementary Note 29)

The environment control method according to supplementary note 21, wherein:

the control device has a table holding an association relation between a work-related goal and the activity kind; and in the determining the activity kind, the activity kind held in the table in association with the work-related goal of the work performed in the area, the work-related goal being input from outside, is determined as the activity kind corresponding to the work performed in the area.

(Supplementary Note 30)

The environment control method according to supplementary note 29, wherein:

the table holds for a single work-related goal a plurality of activity kinds with priorities; and in the determining the activity kind, the activity kind with a highest priority of the activity kinds held in the table in association with the work-related goal of the work performed in the area is determined as the activity kind corresponding to the work performed in the area.

(Supplementary Note 31)

The environment control method according to supplementary note 30, wherein the table holds for each of the activity kinds a correlation coefficient between the activity kind and a work-related goal achievement level, and the priorities are set in accordance with values of correlation coefficients.

(Supplementary Note 32)

The environment control method according to supplementary note 31, further comprising:

calculating the correlation coefficient every given period and updating the table.

(Supplementary Note 33)

The environment control method according to supplementary note 21, wherein in the determining the activity kind, referring to a table, the activity kind corresponding to the work performed in the area is determined, the table holding an association relation between identification information of the area and the activity kind corresponding to the work performed in the area.

(Supplementary Note 34)

The environment control method according to supplementary note 21, further comprising:

acquiring the status of the environment of the area and calculating a first index value corresponding to the acquired status; and acquiring an evaluation of the environment of the area by the person in the area and calculating a second index value corresponding to the acquired evaluation, wherein:

in the acquiring the activity information, a third index value corresponding to the status of the activity is calculated; and in the controlling the environment, a fourth index value is calculated from the first to third index values and first to third weights assigned to the index values, and the facility appliance is caused to control the environment of the area on a basis of the fourth index value.

DESCRIPTION OF NUMERALS 110 area
110A facility appliance
110B environment measuring instrument
110C user terminal
110D activity measuring instrument
120 power sensor
130 communication I/F part
140 operation input part
150 screen display part
160 storage part
160A activity kind information
160B environment information
160B1 objective environment information
160B2 subjective environment information
160C activity information
160D power information
160P program
170 arithmetic processing part
170A activity kind determination part
170B environment information acquisition part
170B1 objective environment information acquisition part
170B2 subjective environment information acquisition part
170C activity information acquisition part
170D power acquisition part
170E environment control part

The invention claimed is:

1. An environment control system comprising:
a facility appliance regulating an environment of an area;
an activity measuring instrument for each activity kind, the activity measuring instrument measuring a status of an activity of a person in the area; and
a control device connected to the facility appliance and the activity measuring instrument,
wherein the control device includes:
an activity kind determiner for determining an activity kind corresponding to a work performed in the area;
an activity information acquisitor for, by using the activity measuring instrument corresponding to the determined activity kind, acquiring the status of the activity of the person in the area; and
an environment controller for causing the facility appliance to control the environment of the area on a basis of the acquired status of the activity,
wherein the activity kind determiner has a table holding an association relation between a work-related goal and the activity kind, and the activity kind determiner determines the activity kind held in the table in association with the work-related goal of the work performed in the area, as the activity kind corresponding to the work performed in the area, the work-related goal being input from outside, and
wherein the table holds for a single work-related goal a plurality of activity kinds with priorities, and the activity kind determiner determines the activity kind with a highest priority of the activity kinds held in the table in association with the work-related goal of the work performed in the area, as the activity kind corresponding to the work performed in the area.

2. The environment control system according to claim 1, wherein the table holds for each of the activity kinds a correlation coefficient between the activity kind and a work-related goal achievement level, and the priorities are set in accordance with values of correlation coefficients.

3. The environment control system according to claim 2, further comprising a verifier for calculating the correlation coefficient every given period and updating the table.

4. The environment control system according to claim 1, wherein the activity kind determiner refers to a table to determine the activity kind corresponding to the work performed in the area, the table holding an association relation between identification information of the area and the activity kind corresponding to the work performed in the area.

5. An environment control system comprising:
a facility appliance regulating an environment of an area;
an activity measuring instrument for each activity kind, the activity measuring instrument measuring a status of an activity of a person in the area; and
a control device connected to the facility appliance and the activity measuring instrument,
wherein the control device includes:
an activity kind determiner for determining an activity kind corresponding to a work performed in the area;
an activity information acquisitor for, by using the activity measuring instrument corresponding to the determined activity kind, acquiring the status of the activity of the person in the area; and
an environment controller for causing the facility appliance to control the environment of the area on a basis of the acquired status of the activity, wherein:
the control device includes:
an objective environment index calculator for acquiring the status of the environment of the area and calculating a first index value corresponding to the acquired status; and
a subjective index calculator for acquiring an evaluation of the environment of the area by the person in the area and calculating a second index value corresponding to the acquired evaluation;
the activity information acquisitor calculates a third index value corresponding to the status of the activity; and
the environment controller calculates a fourth index value from the first to third index values and first to third weights assigned to the index values, and causes the facility appliance to control the environment of the area on a basis of the fourth index value.

6. A control device connected to a facility appliance regulating an environment of an area and to an activity measuring instrument for each activity kind, the activity measuring instrument measuring a status of an activity of a person in the area, the control device comprising:
an activity kind determiner for determining an activity kind corresponding to a work performed in the area;
an activity information acquisitor for, by using the activity measuring instrument corresponding to the determined activity kind, acquiring the status of the activity of the person in the area; and
an environment controller for causing the facility appliance to control the environment of the area on a basis of the acquired status of the activity,
wherein the activity kind determiner has a table holding an association relation between a work-related goal and the activity kind, and the activity kind determiner determines the activity kind held in the table in association with the work-related goal of the work performed in the area, as the activity kind corresponding to the work performed in the area, the work-related goal being input from outside, and
wherein the table holds for a single work-related goal a plurality of activity kinds with priorities, and the activity kind determiner determines the activity kind with a highest priority of the activity kinds held in the table in association with the work-related goal of the work performed in the area, as the activity kind corresponding to the work performed in the area.

7. The control device according to claim 6, wherein the table holds for each of the activity kinds a correlation coefficient between the activity kind and a work-related goal achievement level, and the priorities are set in accordance with values of correlation coefficients.

8. The control device according to claim 7, further comprising a verifier for calculating the correlation coefficient every given period and updating the table.

9. The control device according to claim 6, wherein the activity kind determiner refers to a table to determine the activity kind corresponding to the work performed in the area, the table holding an association relation between identification information of the area and the activity kind corresponding to the work performed in the area.

10. The control device according to claim 6, further comprising:
an objective environment index calculator for acquiring the status of the environment of the area and calculating a first index value corresponding to the acquired status; and
a subjective index calculator for acquiring an evaluation of the environment of the area by the person in the area and calculating a second index value corresponding to the acquired evaluation, wherein:

the activity information acquisitor calculates a third index value corresponding to the status of the activity; and the environment controller calculates a fourth index value from the first to third index values and first to third weights assigned to the index values, and causes the facility appliance to control the environment of the area on a basis of the fourth index value.

\* \* \* \* \*